United States Patent
Matsushita et al.

(10) Patent No.: US 8,309,657 B2
(45) Date of Patent: *Nov. 13, 2012

(54) RUBBER COMPOSITION

(75) Inventors: Junko Matsushita, Tachikawa (JP); Yoichi Ozawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/122,874

(22) PCT Filed: Oct. 7, 2009

(86) PCT No.: PCT/JP2009/067514
§ 371 (c)(1),
(2), (4) Date: Apr. 6, 2011

(87) PCT Pub. No.: WO2010/041695
PCT Pub. Date: Apr. 15, 2010

(65) Prior Publication Data
US 2011/0196086 A1    Aug. 11, 2011

(30) Foreign Application Priority Data
Oct. 7, 2008  (JP) ................................ 2008-260855

(51) Int. Cl.
*C08F 8/00*  (2006.01)
*C08L 9/00*  (2006.01)
(52) U.S. Cl. ........................................ 525/192; 525/232
(58) Field of Classification Search .................. 525/192, 525/232
See application file for complete search history.

(56) References Cited

U.S. PATENT DOCUMENTS
2006/0128879 A1 * 6/2006 Maeda ........................ 524/575.5
2011/0184114 A1 * 7/2011 Matsushita et al. ........... 524/495

FOREIGN PATENT DOCUMENTS
| EP | 1 873 168 A1 | 1/2008 |
| JP | 2004-262973 A | 9/2004 |
| JP | 2005-082766 A | 3/2005 |
| JP | 2007-191611 A | 8/2007 |
| JP | 2008-144074 A | 6/2008 |
| JP | 2008-149934 A | 7/2008 |
| JP | 2008-184506 A | 8/2008 |
| WO | 2007083765 A1 | 7/2007 |
| WO | 2008/032836 A1 | 3/2008 |
| WO | 2008/041631 A1 | 4/2008 |

OTHER PUBLICATIONS

Chinese Office Action, dated Jul. 3, 2012, issued in corresponding Chinese Application No. 200980148742.6.
Communication, dated Jun. 15, 2012, from the European Patent Office in corresponding European Patent Application No. 09819229.7.

* cited by examiner

*Primary Examiner* — Nathan M Nutter
(74) *Attorney, Agent, or Firm* — Sughrue Mion, PLLC

(57) ABSTRACT

An object of the present invention is to provide a rubber composition which not only realizes sufficiently low heat generation properties but also exhibits more excellent crack growth resistance than the conventional rubber composition. The rubber composition contains in 100 mass % of rubber components thereof: 20-80 mass % of natural rubber in which the total nitrogen content in natural rubber latex is in the range of 0.1 mass % to 0.4 mass % (exclusive of 0.1 mass % and inclusive of 0.4 mass %); and butadiene-based polymer having cis content of 90% or higher.

15 Claims, No Drawings

RUBBER COMPOSITION

CROSS REFERENCE TO RELATED APPLICATIONS

This application is a National Stage of International Application No. PCT/JP2009/067514 filed Oct. 7, 2009, which claims priority from Japanese Patent Application No. 2008-260855 filed Oct. 7, 2008, the contents of all of which are incorporated herein by reference in their entirety.

TECHNICAL FIELD

The present invention relates to a rubber composition which is excellent in low heat generation and durability.

PRIOR ART

Due to social demands for saving energy and natural resources in recent years, there has been a need for tires having excellent durability in order to save fuel consumption of automobiles and also a great need for a rubber composition having better low heat generation (low loss properties) and better fracture resistance than the conventional rubber compositions.

In view of these needs, use of a low heat generation-type rubber composition is generally attempted as a technique for reducing rolling resistance of a tire. Use of highly purified natural rubber as disclosed in JP 2004-262973 and/or conjugated diene-based polymer having a relatively high cis content as a rubber component is very effective in order to realize such tire performances as described above.

DISCLOSURE OF THE INVENTION

Problems to be Solved by the Invention

However, in a case where such natural rubber as described above is employed, a non-rubber component present in the natural rubber may trigger generation of cracks in the rubber. Further, in a case where such conjugated diene-based polymer is employed as described above, the vinyl structure in the polymer may trigger generation of cracks. Accordingly, there is some room for improvement in such a low heat generation-type rubber composition as described above in terms of sufficiently suppressing generation of cracks.

Further, at present there is studied application of butadiene-based polymer having a functional group introduced thereto by a modifying agent, in order to realize further improvement of the low heat generation properties. However, the type of a functional group which can be introduced into butadiene-based polymer by a modifying agent after a polymerization reaction in coordination polymerization is restricted to specific ones, whereby the degree of freedom in selecting a functional group to be introduced into butadiene-based polymer still remains low when an attempt is made to realize better properties of low heat generation of the butadiene-based polymer.

In view of the facts above, an object of the present invention is to provide a rubber composition which not only realizes sufficiently low heat generation properties but also is excellent in resistance to crack growth.

In order to achieve the object, the present inventors have discovered a rubber composition in which specific types of natural rubber and butadiene-based polymer having a relatively high cis content are used as rubber components, whereby completing the present invention.

Specifically, a rubber composition of the present invention, comprises in 100 mass % of rubber components thereof: 20-80 mass % of natural rubber in which the total nitrogen content in natural rubber latex is in the range of 0.1 mass % to 0.4 mass % (exclusive of 0.1 mass % and inclusive of 0.4 mass %); and butadiene-based polymer having cis content of 90% or higher.

It is preferable that the molecular weight distribution (Mw/Mn) of the butadiene-based polymer is not larger than 3.5 and the vinyl content thereof is not larger than 2.0%. Further, it is preferable that 100 mass % of the rubber components contains 80-20 mass % of the butadiene-based polymer.

Yet further, it is preferable that the natural rubber is rubber obtained from latex resulting from partial deproteinization of protein in natural rubber latex by mechanical separation techniques, a chemical treatment or a processing method using enzymes.

It is preferable that the butadiene-based polymer is modified by a modifying agent and that the modifying agent has a modifying group having at least one type of atom selected from the group consisting of nitrogen atom, oxygen atom and sulfur atom. As the modifying agent described above, a heterocyclic nitrile compound is preferable, which may be represented by formula (W1) or formula (W2).

(in formulae (W1) and (W2), θ represents a heterocyclic group and $R_x$ represents a divalent hydrocarbon group)

In formulae (W1) and (W2), θ is preferably at least one type of heterocyclic group selected from the group consisting of heterocyclic group having nitrogen atom, heterocyclic group having oxygen atom, heterocyclic group having sulfur atom, heterocyclic group having two or more hetero atoms, and heterocyclic group having at least one cyano group, and more preferably one of heteroaromatic ring group, hetero-non-aromatic ring group, and hetero (mono, bi, tri, or poly) cyclic group.

Further, the modifying agent may be at least one type of compound selected from compounds having components (a) to (g):

component (a) as one of a halogenated organic metal compound, halogenated metal compound and an organic metal compound, represented by $R^6{}_n M'Z_{4-n}$, $M'Z_4$, $M'Z_3$, $R^7{}_n M'(-R^8-COOR^9)_{4-n}$, or $R^7{}_n M'(-R^8-COOR^9)_{4-n}$, (in the formula, $R^6$ to $R^8$ are $C_{1-20}$ hydrocarbon groups, respectively, which may be the same or different from each other, $R^9$ is a $C_{1-20}$ hydrocarbon group of which side chain main contain carbonyl group or ester group, M' is one of tin atom, silicon atom, germanium atom and phosphor atom, Z is a halogen atom, and n is an integer in the range of 0 to 3);

component (b) as a heterocumulene compound containing in the molecule thereof Y=C=Y' bond (in the formula, Y represents one of carbon atom, oxygen atom, nitrogen atom and sulfur atom, Y' represents one of oxygen atom, nitrogen atom and sulfur atom; component (c) as a hetero-3-membered ring compound containing in the molecule thereof a bond represented by formula (I) below,

(In formula (I), Y' represents one of oxygen atom, nitrogen atom and sulfur atom); compound (d) as a halogenated isocyano compound;

compound (e) as $R^{10}$—$(COOH)_m$, $R^{11}(COZ)_m$, $R^{12}$—$(COO-R^{13})$, $R^{14}$—$OCOO$—$R^{15}$, $R^{16}$—$(COOCO-R^{17})_m$, or one of carboxylic acid, acid halide, ester compound, carbonate ester compound and acid anhydride, represented by formula (II),

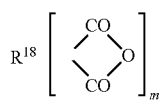

(II)

(In formula (II), $R^{10}$ to $R^{18}$ are $C_{1-50}$ hydrocarbon groups, respectively, which may be the same or different from each other, Z is a halogen atom, and m is an integer in the range of 1 to 5);

compound (f) as $R^{19}{}_k M''(OCOR^{20})_{4-k}$, $R^{21}{}_k M''(OCO-R^{22}-COOR^{23})_{4-k}$, or a metal salt of carboxylic acid, represented by formula (III),

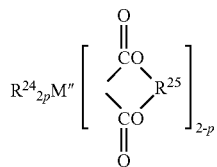

(III)

(In formula (III), $R^{19}$ to $R^{25}$ are $C_{1-20}$ hydrocarbon groups, respectively, which may be the same or different from each other, M'' is one of tin atom, silicon atom and germanium atom, k is an integer in the range of 0 to 3, and p is 0 or 1);

component (g) as one of N-substituted aminoketone, N-substituted aminothioketone, N-substituted aminoaldehyde, N-substituted aminothioaldehyde, and a compound having in the molecule thereof —C-(=M)-N< bond (M represents oxygen atom or sulfur atom).

The aforementioned modifying agent may be at least one type of (h) component selected from the compounds represented by formula (IV).

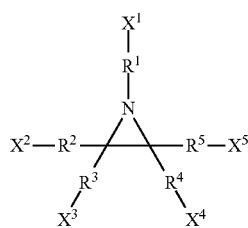

(IV)

(In formula (IV), $X^1$ to $X^5$ each represents hydrogen atom or a functional group having at least one type selected from the group consisting of halogen atom, carbonyl group, thiocarbonyl group, isocyanate group, thioisocyanate group, epoxy group, thioepoxy group, halogenated silyl group, hydrocarvyloxysilyl group, and sulphonyloxy group; $X^1$ to $X^5$ may be the same or different from each other, but at least one of them is not hydrogen atom; $R^1$ to $R^5$ each independently represent a single bond or a divalent $C_{1-18}$ hydrocarbon group; and plural aziridine rings may be bonded by way of any of $X^1$ to $X^5$ and $R^1$ to $R^5$).

The aforementioned butadiene-based polymer is preferably produced by polymerizing butadiene-based monomers by a catalytic system constituted of at least one component selected from:

component (A): a reactant obtained by reacting a substance containing lanthanide rare earth element(s) having atomic number 57-71 in periodic table or a compound thereof with a Lewis base;

component (B): an organic aluminum compound represented by $AlR^{26}R^{27}R^{28}$ (in the formula, $R^{26}$ and $R^{27}$ are $C_{1-10}$ hydrocarbon groups or hydrogen atoms, respectively, which may be the same or different from each other, $R^{28}$ is a $C_{1-10}$ hydrocarbon group, and $R^{28}$ may be either the same as or different from $R^{26}$ and $R^{27}$); and component (C): Lewis acid, a complex compound obtained from a reaction between a metal halide and a Lewis base, and an organic metal compound containing active halogen.

Further, the cis content of the butadiene-based polymer is preferably 98% or more.

Yet further, the content of non-rubber components in the natural rubber is preferably less than 6 mass %.

Effect of the Invention

According to the rubber composition of the present invention, since the rubber composition uses as rubber components thereof the natural rubber and the butadiene-based polymer having a relatively high cis content of specific types described above, it can exhibit excellent low heat generation properties and significantly improve crack growth resistance, as compared with the conventional rubber compositions. Further, degree of freedom in selecting a functional group which can be introduced into the butadiene-based polymer is enhanced, as compared with the conventional rubber compositions, whereby it is possible to obtain a rubber composition having further improved low heat generation properties by introduction of a functional group.

Therefore, a high-performance tire excellent in both low heat generation properties and crack growth resistance can be realized by employing the rubber composition of the present invention as a rubber composition for tires.

BEST MODE FOR IMPLEMENTING THE PRESENT INVENTION

The present invention will be described in detail hereinafter. The rubber composition of the present invention characteristically contains in 100 mass % of rubber components thereof: 20-80 mass % of natural rubber in which the total nitrogen content in natural rubber latex is in the range of 0.1 mass % to 0.4 mass % (exclusive of 0.1 mass % and inclusive of 0.4 mass %); and butadiene-based polymer having cis content of 90% or higher.

[Natural Rubber]

In the natural rubber for use in the present invention, the total nitrogen content in natural rubber latex thereof is to be in the range of 0.1 mass % to 0.4 mass % (exclusive of 0.1 mass % and inclusive of 0.4 mass %), preferably in the range of 0.1 mass % to 0.3 mass % (exclusive of 0.1 mass % and inclusive of 0.3 mass %), and more preferably in the range of 0.12 mass % to 0.2 mass % (exclusive of 0.12 mass % and inclusive of 0.2 mass %). In a case where the total nitrogen content in natural rubber latex exceeds the aforementioned upper limit, it is difficult to achieve sufficiently low heat generation properties because unbound proteins exist in the natural rubber latex. In a case where the total nitrogen content is less than the lower limit, vulcanization and/or workability may be adversely affected because bound proteins have also been removed.

The natural rubber is preferably rubber obtained from latex resulted from partial deproteinization of protein in natural rubber latex by mechanical separation techniques, a chemical treatment or a processing method using enzymes. Such natural rubber as described above can be obtained by, in the general natural rubber production process, i.e. the process including tapping, coagulation, washing, dehydration, drying and packing of latex in this order, especially subjecting latex after being tapped and prior to coagulation to partial deproteinization by the mechanical separation techniques, preferably by centrifugal separation and concentration, such that the total nitrogen content in the solid components thereof is set in a predetermined range and then coagulating and drying the natural rubber latex thus obtained.

Further, the aforementioned natural rubber can be obtained by a chemical treatment or a treatment using enzymes. Examples of the chemical treatment and the treatment using enzymes include a decomposition treatment using enzymes, repetitive washing using a surfactant, a method of using both enzymes and a surfactant, an ester exchange treatment using sodium methoxide, and saponification using sodium hydroxide, potassium hydroxide or the like. Examples of the enzymes include protease, peptidase, cellulase, pectinase, lipase, esterase, amylase, which may be used either solely or in combination. The enzyme activity of these enzymes is preferably in the range of 0.1 to 50 APU/g. The partial proteinization is preferably carried out by mechanical centrifugal separation and concentration. The type of natural rubber latex as the raw material is not particularly restricted and field latex and/or commercial latex can be used.

The total nitrogen content in the natural rubber of the present invention is an index of protein content and can be controlled by adjusting the centrifugal separation conditions (rotation number, time, etc.) of the natural rubber latex as the raw material. It is necessary that the natural rubber of the present invention is produced such that the total nitrogen content of a resulting natural rubber product is adjusted to be within the aforementioned numerical range. The conditions of the centrifugal separation are not particularly restricted, and preferable examples thereof include repeating centrifugal separations several times at a rotation number around 7500 rpm. Specifically, the latex is preferably produced by adjusting the total nitrogen content in the solid components of centrifugal-separated and concentrated latex to a content in the range of 0.1 to 0.4 mass % (exclusive of 0.1 mass % and inclusive of 0.4 mass %) and then coagulating and drying the resulting product. On the other hand, surprisingly, components which are effective as antioxidant such as tocotrienol are hardly lost by the operational conditions for partial deproteinization described above, whereby heat resistance properties of the natural rubber of the present invention can be maintained at substantially the same level as that of the conventional natural rubber.

The content of non-rubber components in the natural rubber of the present invention is to be less than 6 mass %, preferably less than 5 mass %, and more preferably less than 4 mass %. It is preferable that the non-rubber components are removed as best as possible. Reducing the content of non-rubber components which may trigger crack generation as best as possible and use of the butadiene-based polymer described in detail below in combination enable significantly improving crack growth resistance of the rubber composition.

The content of saccharides in the aforementioned natural rubber is to be not larger than 0.4 mass % and preferably not larger than 0.3 mass %.

The rubber component obtained by coagulating the latex subjected to the aforementioned treatments is washed and dried by using a conventional drier such as a vacuum drier, an air drier, a drum drier or the like, whereby the natural rubber of the present invention is produced. That is, the natural rubber of the present invention can be produced by subjecting natural rubber latex as a raw material to partial deproteinization in a centrifugal separation and concentration process such that the total nitrogen content in the solid components thereof is adjusted in the range of 0.1 mass % to 0.4 mass % (exclusive of 0.1 mass % and inclusive of 0.4 mass %) and then coagulating and drying the thus obtained natural rubber concentrated latex.

[Butadiene-Based Polymer]

In the butadiene-based polymer of the present invention, the cis content (the content of 1,4-cis bond) is to be 90% or more, preferably 94% or more, more preferably 96% or more, and most preferably 98% or more. In a case where the cis content of the butadiene-based polymer is less than 90%, the superior effect of the present invention may not be sufficiently demonstrated. Stain-induced crystallization is facilitated when the cis content of the butadiene-polymer is within the aforementioned ranges, and this facilitated strain-induced crystallization and use of the aforementioned natural rubber in combination enable the rubber composition of the present invention to exhibit excellent crack growth resistance. In the present invention, "cis content" represents proportion of 1,4-cis bond in a butadiene monomer unit in the butadiene-based polymer.

The vinyl content of the butadiene-based polymer, i.e. the content of 1,2-vinyl bond, is normally 2.0% or less, preferably 1.2% or less, more preferably 1.0% or less, and most preferably 0.9% or less. In a case where the vinyl content of the butadiene-based polymer is beyond the aforementioned ranges, strain-induced crystallization is disturbed and resistance to crack growth may deteriorate. In the present invention, "vinyl content" represents proportion of 1,2-vinyl bond in a butadiene monomer unit in the butadiene-based polymer.

Further, the number average molecular weight (Mn) of the butadiene-based polymer is preferably in the range of 100,000 to 500,000, and more preferably in the range of 150,000 to 300,000. The distribution of molecular weight (Mw/Mn) of the butadiene-based polymer is normally not larger than 3.5, preferably not larger than 3.0, and more preferably not larger than 2.5. In the present invention, Mn and Mw/Mn respectively represent values obtained by gel permeation chromatography (GPC) using polystyrene as the reference material.

In the aforementioned butadiene-based polymer, it is preferable that the content of 1,3-butadiene monomer unit is in the range of 80-100 mass % and the content of other monomer units copolymerizable with 1,3-butadiene is in the range of 20 to 0 mass %. In a case where the content of 1,3-butadiene monomer unit in the polymer is less than 80 mass %, the content of 1,4-cis bond with respect to the polymer as a whole decreases, whereby the superior effect of the present invention may not be sufficiently demonstrated. It is particularly preferable that the butadiene-based polymer of the present invention is constituted of only 1,3-butadine monomers. That is, it is particularly preferable that the butadiene-based polymer of the present invention is polybutadiene rubber (BR).

In the present invention, examples of "other monomers" copolymerizable with 1,3-butadiene include $C_{5-8}$ conjugated diene monomer, aromatic vinyl monomer, and the like. Among these examples, $C_{5-8}$ conjugated diene monomer is preferable. Examples of the $C_{5-8}$ conjugated diene monomer include 2-methyl-1,3-butadiene, 2,3-dimethyl-1,3-butadiene, 1,3-pentadiene, 1,3-hexadiene, and the like. Examples of the aromatic vinyl monomer include styrene, p-methylstyrene, α-methylstyrene, vinylnaphthalene, and the like.

The aforementioned butadiene-based polymer is preferably produced by polymerizing monomers including at least 1,3-butadiene by a catalytic system described below. Examples of the monomers include 1,3-butadiene monomer and other monomers copolymerizable with 1,3-butadiene described above. Examples of the catalytic system include a catalytic system constituted of at least one component selected from:

component (A) as a reactant obtained by reacting a substance containing rare earth element(s) having atomic number 57-71 in periodic table or a compound thereof with a Lewis base;
component (B) as an organic aluminum compound represented by formula (XVII) below, $$AlR^{26}R^{27}R^{28} \quad (XVII)$$

In the formula, $R^{26}$ and $R^{27}$ are $C_{1-10}$ hydrocarbon groups or hydrogen atoms, respectively, which may be the same or different from each other, $R^{28}$ is a $C_{1-10}$ hydrocarbon group, and $R^{28}$ may be either the same as or different from $R^{26}$ and $R^{27}$); and
component (C) as one of Lewis acid, a complex compound obtained from a reaction between a metal halide and a Lewis base, and an organic metal compound containing active halogen.

Further, in the present invention, it is preferable to add organic aluminumoxy compound (i.e. aluminoxane) as component (D), as well as components (A) to (C), to the catalytic system for use in polymerization of the butadiene-based polymer. In the present invention, it is further preferable that the catalytic system is prepared prior to polymerization under the presence of component (A), component (B), component (C), component (D) and conjugated diene monomers described above.

In the present invention, component (A) of the catalytic system for use in polymerization of the butadiene-based polymer is a reactant obtained by reacting a substance containing rare earth element(s) having atomic number(s) 57-71 in periodic table or a compound thereof with a Lewis base. Among the rare earth elements having atomic numbers 57-71, neodymium, praceodymium, cerium, lanthanum, gadolinium, and the like, and mixture thereof are preferable. Neodymium is particularly preferable.

As the substance containing rare earth elements, a salt or a complex soluble to a hydrocarbon solvent is preferable and specific examples thereof include carboxylic acid salt, alkoxide, β-diketone complex, phosphate salt and phophite salt of the aforementioned rare earth elements. Among these examples, carboxylic acid salt and phosphate salt are preferable. Carboxylic acid salt is particularly preferable.

In the present invention, examples of the hydrocarbon solvent include: saturate aliphatic $C_{4-10}$ hydrocarbon such as butane, pentane, hexane, heptanes; saturate aliphacyclic $C_{5-20}$ hydrocarbon such as cyclopentane, cyclohexane; monoolefin such as 1-butene, 2-butene; aromatic hydrocarbon such as benzene, toluene, xylene; and halogenated hydrocarbon such as methylene chloride, chloroform, trichloroethylene, perchloroethylene, 1,2-dichloroethane, chlorobenzene, bromobenzene, chlorotoluene.

Examples of carboxylic acid salt of the aforementioned rare earth elements include a compound represented by formula (XVIII) below, $$(R^{29}-CO_2)_3M \quad (XVIII)$$

In the formula, $R^{29}$ is a $C_{1-20}$ hydrocarbon group and M represents a rare earth element having atomic number 57-71 of periodic table. Further, in the formula, $R^{29}$ may be either a saturated or unsaturated group, preferably either an alkyl or alkenyl group, and either normal, branched or cyclic. The carboxyl group is bonded to one of primary, secondary and tertiary carbon atoms. Specific examples of the carboxylic acid salt include salts of octanoic acid, 2-ethylhexanoic acid, oleic acid, neodecanoic acid, stearic acid, benzoic acid, naphthenic acid, versatic acid (a product name of a carboxylic acid in which a carboxyl group is bonded to tertiary carbon atom, manufactured by Shell Chemicals Co., Ltd.). Among these examples, salts of 2-ethylhexanoic acid, neodecanoic acid, naphthenic acid and versatic acid are preferable.

Examples of alkoxide of the aforementioned rare earth elements include a compound represented by formula (XIX) below, $$(R^{30}O)_3M \quad (XIX)$$

In the formula, $R^{30}$ is a $C_{1-20}$ hydrocarbon group and M represents a rare earth element having atomic number 57-71 of periodic table. Examples of alkoxy group represented by $R^{30}O$ include 2-ethyl-hexyloxy group, oleyloxy group, stearyloxy group, phenoxy group, benzyloxy group, and the like. Among these examples, 2-ethyl-hexyloxy group and benzyloxy group are preferable.

Examples of β-diketone complex of the aforementioned rare earth elements include acetylacetone complex, benzoylacetone complex, propionitrileacetone complex, valerylacetone complex, ethylacetylacetone complex, and the like, of the rare earth elements. Among these examples, acetylacetone complex and ethylacetylacetone complex are preferable.

Preferable examples of phosphate salt and phosphite salt of the aforementioned rare earth elements include salts of the aforementioned rare earth elements formed with bis(2-ethylhexyl) phosphoric acid, bis(1-methylheptyl) phosphoric acid, bis(p-nonylphenyl) phosphoric acid, bis(polyethylene glycol-p-nonylphenyl) phosphoric acid, (1-methylheptyl)(2-ethylhexyl) phosphoric acid, (2-ethylhexyl) (p-nonylphenyl) phosphoric acid, mono-(2-ethylhexyl) 2-ethylhexylphosphonic acid, mono-(p-nonylphenyl) 2-ethylhexylphosphonic acid, bis(2-ethylhexyl) phosphinic acid, bis(1-methylheptyl) phosphinic acid, bis(p-nonylphenyl) phosphinic acid, (1-methylheptyl)(2-ethylhexyl) phosphinic acid, (2-ethylhexyl) (p-nonylphenyl) phosphinic acid, and the like. Among these examples, salts of the aforementioned rare earth elements formed with bis(2-ethylhexyl) phosphoric acid, bis(1-methylheptyl) phosphoric acid, mono-(2-ethylhexyl) 2-ethylhexylphosphonic acid, and bis(2-ethylhexyl) phosphinic acid are preferable.

Among the substance containing the aforementioned rare earth elements, phosphate salt of neodymium and carboxylic acid salt of neodymium are preferable. Salt of neodymium and branched carboxylic acid, such as 2-ethylhexanoate salt of neodymium, neodecanoate salt of neodymium, and versaticate salt of neodymium are particularly preferable.

Further, component (A) may be a reactant obtained by reacting the substance containing the aforementioned rare earth elements with a Lewis base. Such a reactant exhibits improved solubility of the rare earth element containing substance to a solvent and can be stably stored for a long period, due to the Lewis base. The Lewis base used for improving solubility of the rare earth containing substance to a solvent and enabling the substance to be stored stably for a long period is added by 0 to 30 mol, preferably 1 to 10 mol per 1 mol of the rare earth element in the form of either mixture of the rare earth containing substance and the Lewis base or a reactant obtained by reacting the substance with the Lewis base in advance. In the present invention, examples of Lewis base include acetylacetone, tetrahydrofuran, pyridine, N,N-dimethylformaldehyde, thiophene, diphenyl ether, triethylamine, organic phosphor compound, and mono or divalent alcohol.

The rare earth element-containing substances or reactants obtained by reacting these substances with Lewis bases described above, as component (A), may be either used solely by one type or in combination of two or more types.

In the present invention, preferable examples of the organic aluminum compound represented by formula (XVII) as component (B) of the catalytic system for use in polymerization of the butadiene-based polymer include trimetylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, and isobuylaluminum dihydride. Among these examples, triethyaluminum, triisobutylaluminum, diethylaluminum hydride and diisobutylaluminum hydride are particularly preferable. The organic aluminum compounds as component (B) described above may be used either solely by one type or in combination of two or more types.

In the present invention, component (C) of the catalytic system for use in polymerization of the butadiene-based polymer is at least one type of halogen compound selected from the group consisting of Lewis acid, a complex compound obtained from a reaction between a metal halide and a Lewis base, and an organic metal compound containing active halogen.

The Lewis acid described above has Lewis acidity and is soluble to hydrocarbon. Specific examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromie, ethylaluminum sesquichloride, dibutyltin dichloride, aluminum trichloride, antimony trichloride, antimony pentachloride, phosphor trichloride, phosphor pentachloride, tin(IV) chloride, silicon (IV) chloride, and the like. Among these examples, diethylaluminum chloride, ethylaluminum sesquichloride, ethylaluminum dichloride, diethylaluminum bromide, ethylaluminum sesquibromide and ethylaluminum dibromide are particularly preferable. Further, a product obtained by a reaction between alkylaluminum and halogen, such as a product obtained by a reaction between triethylaluminum and bromine, can also be used.

Examples of the metal halide for constituting a complex compound formed by the metal halide and a Lewis base include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like. Among these examples, magnesium chloride, calcium chloride, barium chloride, manganese chloride, zinc chloride and copper chloride are preferable and magnesium chloride, manganese chloride, zinc chloride and copper chloride are particularly preferable.

Preferable examples of the Lewis base for constituting a complex compound with the metal halide described above include a phosphor compound, a carbonyl compound, a nitrogen compound, an ether compound, an alcohol, and the like. Specific examples of the Lewis base include tributyl phosphate, tri-2-ethylhexyl phosphate, triphenyl phosphate, tricresyl phosphate, triethyl phosiphine, tributyl phosphine, triphenyl phosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ehtyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Among these examples, tri-2-ethyhexyl phosphate, tricresyl phosphate, acetylacetone, 2-ethylhexanoic acid, versatic acid, 2-ethylhexyl alcohol, 1-decanol and laryl alcohol are preferable.

The Lewis base is added for reaction generally by 0.01 to 30 mol, preferably by 0.5 to 10 mol, per 1 mol of the aforementioned metal halide. Metal residue in polymer can be reduced by using a reactant obtained by a reaction between the metal halide and the Lewis base.

Examples of the organic compound containing active halogen, described above, include benzyl chloride and the like.

In the present invention, it is preferable to further add an organic aluminoxane compound, i.e. aluminoxane, as compound (D) in addition to components (A) to (C) described above to the catalytic system for use in polymerization of the butadiene-based polymer. In the present invention, examples of aluminoxane include methylaluminoxane, ethylaluminoxane, propylaluminoxane, butylaluminoxane, chloroaluminoxane, and the like. The distribution of molecular weight is rendered sharp and activity of the catalyst is enhanced by adding aluminoxane as component (D).

The amounts or compositional ratios of the respective components of the catalytic system for use in the present invention may be appropriately selected in accordance with an object of or the necessity in the invention. Among the respective components, component (A) is used preferably by 0.00001 to 1.0 mmol, more preferably by 0.0001 to 0.5 mmol, with respect to 100 g of 1,3-butadiene. In a case where the used amount of component (A) is less than 0.00001 mmol with respect to 100 g of 1,3-butadiene, polymerization activity deteriorates. In a case where the used amount of component (A) exceeds 1.0 mmol with respect to 100 g of 1,3-butadiene, the catalyst concentration is too high and a demineralization process will be required. The ratio of component (A) with respect to component (B) is, in mol ratio as component (A):component (B), generally 1:1 to 1:700 and preferably 1:3 to 1:500. Further, the ratio of component (A) with respect to halogen in component (C) is, in mol ratio therebetween, generally 1:0.1 to 1:30, preferably 1:0.2 to 1:15, more preferably 1:2.0 to 1:5.0. Yet further, the ratio of aluminum in component (D) with respect to component (A) is, in mol ratio therebetween, generally 1:1 to 700:1 and preferably 3:1 to 500:1. When the amounts or the compositional ratios of the respective components of the catalytic system are beyond the aforementioned ranges, the catalytic system fails to function as highly active catalyst or requires a process for removing catalyst residue later, which is not preferable. It is acceptable to make hydrogen gas coexist with the aforementioned components (A) to (C) in order to adjust the molecular weight of polymer in the polymerization reaction.

It is acceptable to use, according to necessity, a small amount of conjugated diene monomer such as 1,3-butadiene as another catalyst component in addition to components (A), (B) and (C), specifically by 0 to 1000 mol per 1 mol of a component (A) compound. Although conjugated diene monomer such as 1,3-butadiene is not essential as a catalyst component, use thereof with other components advantageously further enhances activity of the catalytic system.

The catalyst described above is produced by dissolving components (A) to (C) in a solvent and, if necessary, reacting the mixture with 1,3-butadiene. In this production process, the order of adding the respective components is not particularly restricted and aluminoxane may be added as component (D). It is preferable to mix the respective components, allow them to be reacted with each other and leave the reactant for a sufficient time in advance in terms of improving the polymerization activity and shortening an induction period prior to the onset of polymerization. The temperature at which the reactant is left to complete the reaction is to be in the range of 0 to 100° C. and preferably in the range of 20 to 80° C. When the temperature is lower than 0° C., the reactant may not reach a fully reacted state. When the temperature exceeds 100° C., the catalytic activity may deteriorate and/or the distribution of molecular weight may expand. The time during which the reactant is left is not particularly restricted. The reactant can reach a fully reacted state by bringing the components into contact in a production line prior to being added to a polymerization reaction vessel. 0.5 minute is normally sufficient for the time during which the components and the reactant are left. The reactant generally remains stable for a few days.

Production of the aforementioned butadiene-based is preferably carried out by solution polymerization. In the present invention, an inactive organic solvent is used as a polymerization solvent in solution polymerization. Examples of the inactive organic solvent include: $C_{4-10}$ saturated aliphatic hydrocarbon such as butane, pentane, hexane, heptane; $C_{5-20}$ saturated aliphacyclic hydrocarbon such as cyclopentane, cyclohexane; monoolefin such as 1-butene, 2-butene; aromatic hydrocarbon such as benzene, toluene, xylene; halogenated hydrocarbon such as methylene chloride, chloroform, carbon tetrachloride, trichloroethylene, perchloroethylene, 1,2-dichloroethylene, chlorobenzene, bromobenzene, chlorotoluene, and the like. Among these examples, $C_{5-6}$ aliphatic hydrocarbon and $C_{5-6}$ aliphacyclic hydrocarbon are particularly preferable. These solvents described above may be used either solely by one type or in combination of two or more types.

The production of the butadiene-based polymer need be carried out at the polymerization temperature of 25° C. or lower, preferably in the range of 10 to −78° C. In a case where the polymerization exceeds 25° C., the polymerization reaction cannot be sufficiently controlled, whereby the content of cis-1,4 bond in the produced butadiene-based polymer decreases and the content of vinyl bond increases. In a case where the polymerization temperature is lower than −78° C., the temperature is below the freezing point of the solvent and polymerization cannot be carried out.

The production of the butadiene-based polymer may be carried out either in batch reactors or by continuous polymerization. In the production of the butadiene-based polymer, cares must be taken to prevent any compound which may adversely affect catalytic activity, e.g. oxygen, water, carbon dioxide, from mixing into the reaction system of polymerization as best as possible, so that the catalyst based on the rare earth element-containing substance and the polymer do not lose catalytic activity thereof.

[Modifying Agent]

The butadiene-based polymer is preferably modified by a modifying agent. The modifying agent preferably includes a modifying group having at least one type of atom selected from the group consisting of nitrogen atom, oxygen atom and sulfur atom. In a case where the modifying group has such an atom(s), action of delocalized electrons existing in the polymer is triggered by the atom(s) present in the modifying group, whereby affinity of the polymer with respect to carbon black is improved, the fillers like carbon black can be very effectively dispersed in the polymer, and therefore excellently low heat generation properties of the rubber composition can be realized. Further, the modifying agent contains preferably substantially no active proton and more preferably no active proton. In a case where active proton exists in the modifying agent, when a polymerization initiator such as an organic lithium compound is used in polymerization of the butadiene-based polymer, for example, active proton is easily bound to lithium bonded at the terminal end of the polymer, thereby disturbing polymerization. Further, presence of active proton in the modifying agent may disturb smooth introduction of a desired modifying group to the butadiene-based polymer, thereby possibly being a factor of inhibiting demonstration of the superior effects of the present invention described above.

The modifying agent is preferably a heterocyclic nitrile compound. A modifying group which can be introduced to butadiene-based polymer has been conventionally restricted to specific groups such as —CN, —SiCl, —SiOR, C═O. However, in the present invention, a conjugated modifying group, which is more suitable than the specific groups described above in terms of realizing better low heat generation properties, can be introduced to the butadiene-based polymer. Such a conjugated modifying group as described above contributes to improving affinity of the polymer with respect to fillers such as carbon black.

Specifically, the heterocyclic nitrile compound is preferably a compound represented by formula (W1) or formula (W2).

(W1)

(W2)

In formulae (W1) and (W2), θ represents a heterocyclic group. θ preferably represents at least one type of heterocyclic group selected from the group consisting of a heterocyclic group having nitrogen atom, a heterocyclic group having oxygen atom, a heterocyclic group having sulfur atom, a heterocyclic group having two or more hetero atoms, and a heterocyclic group having at least one cyano group. Further, θ may represent one of heteroaromatic ring group or heterononaromatic group such as thiophene, pyridine, furan, piperidine, dioxane; and hetero (mono, bi, tri, or poly) cyclic group.

Specific examples of θ as a heterocyclic group having nitrogen atom include 2-pyridyl, 3-pyridyl, 4-pyridyl, pyradinyl, 2-pyrimidinyl, 4-pyrimidinyl, 5-pyrimidinyl, 3-pyridadinyl, 4-pyridadinyl, N-methyl-2-pyrrolyl, N-methyl-3-pyrrolyl, N-methyl-2-imidazolyl, N-methyl-4-imidazolyl, N-methyl-5-imidazolyl, N-methyl-3-pyrazolyl, N-methyl-4- pyrazolyl, N-methyl-5-pyrazolyl, N-methyl-1,2,3-triazole-4-yl, N-methyl-1,2,3-triazole-5-yl, N-methyl-1,2,4-triazole-3-yl, N-methyl-1,2,4-triazole-5-yl, 1,2,4-triazine-3-yl, 1,2,4-triazine-5-yl, 1,2,4-triazine-6-yl, 1,3,5-triazinyl, N-methyl-2-pyrroline-2-yl, N-methyl-2-pyrroline-3-yl, N-methyl-2-pyrroline-4-yl, N-methyl-2-pyrroline-5-yl, N-methyl-3-pyrroline-2-yl, N-methyl-3-pyrroline-3-yl, N-methyl-2-imidazoline-2-yl, N-methyl-2-imidazoline-4-yl, N-methyl-2-imidazoline-5-yl, N-methyl-2-pyrazoline-3-yl, N-methyl-2-pyrazoline-4-yl, N-methyl-2-pyrazoline-5-yl, 2-xynolyl, 3-xynolyl, 4-xynolyl, 1-isoxynolyl, 3-isoxynolyl, 4-isoxynolyl, N-methylindole-2-yl, N-methylindole-3-yl, N-methyisolindole-1-yl, N-methyisolindole-3-yl, 1-indolizinyl, 2-indolizinyl, 3-indolizinyl, 1-phtharadinyl, 2-quinazolinyl, 4-quinazolinyl, 2-quinoxalinyl, 3-cinnolinyl, 4-cinnolinyl, 1-methylindazole-3-yl, 1,5-naphthyridine-2-yl, 1,5-naphthyridine-3-yl, 1,5-naphthyridine-4-yl, 1,8-naphthyridine-2-yl, 1,8-naphthyridine-3-yl, 1,8-naphthyridine-4-yl, 2-pteridinyl, 4-pteridinyl, 6-pteridinyl, 7-pteridinyl, 1-methylbenzimidazole-2-yl, 6-phenanthridinyl, N-methyl-2-purinyl, N-methyl-6-purinyl, N-methyl-8-purinyl, N-methyl-β-carboline-1-yl, N-methyl-β-carboline-3-yl, N-methyl-p-carboline-4-yl, 9-acrydinyl, 1,7-phenanethroline-2-yl, 1,7-phenanethroline-3-yl, 1,7-phenanethroline-4-yl, 1,10-phenanethroline-2-yl, 1,10-phenanethroline-3-yl, 1,10-phenanethroline-4-yl, 7-phenanethroline-1-yl, 4,7-phenanethroline-2-yl, 4,7-phenanethroline-3-yl, 1-phenadinyl, 2-phenadinyl, pyrrolidino, and piperidino.

Examples of the heterocyclic group having oxygen atom include 2-furyl, 3-furyl, 2-benzo[b]furyl, 3-benzo[b]furyl, 1-isobenzo[b]furyl, 3-isobenzo[b]furyl, 2-naphto[2,3-b]furyl, and 3-naphto[2,3-b]furyl.

Examples of the heterocyclic group having sulfur atom include 2-thienyl, 3-thienyl, 2-benzo[b]thienyl, 3-benzo[b]thienyl, 1-isobenzo[b]thienyl, 3-isobenzo[b]thienyl, 2-naphto[2,3-b]thienyl, and 3-naphto[2,3-b]thienyl.

Examples of the heterocyclic group having two or more hetero atoms include 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,2,3-oxaziasole-4-yl, 1,2,3-oxaziasole-5-yl, 1,3,4-oxaziasole-2-yl, 1,2,3-thiaziasole-4-yl, 1,2,3-thiaziasole-5-yl, 1,3,4-thiaziasole-2-yl, 2-oxazoline-2-yl, 2-oxazoline-4-yl, 2-oxazoline-5-yl, 3-isoxazolinyl, 4-isoxazolinyl, 5-isoxazolinyl, 2-thiazoline-2-yl, 2-thiazoline-4-yl, 2-thiazoline-5-yl, 3-isothiazolinyl, 4-isothiazolinyl, 5-isothiazolinyl, 2-benzothiazolyl, and morpholino.

Among these examples, θ is preferably a heterocyclic group having nitrogen atom and particularly preferably 2-pyridyl, 3-pyridyl and 4-pyridyl.

In formulae (W1) and (W2), $R_x$ represents a divalent hydrocarbon group, which may be alkylene, alkenylene, arylelne group or the like corresponding to the heterocyclic nitrile compound described below.

Regarding such a heterocyclic nitrile compound as described above, specific examples of the compound having a heterocyclic group containing nitrogen atom include 2-pyridinecarbonitrile, 3-pyridinecarbonitrile, 4-pyridinecarbonitrile, pyradinecarbonitrile, 2-pyrimidinecarbonitrile, 4-pyrimidinecarbonitrile, 5-pyrimidinecarbonitrile, 3-pyridazinecarbonitrile, 4-pyridazinecarbonitrile, N-methyl-2-pyrrolecarbonitrile, N-methyl-3-pyrrolecarbonitrile, N-methyl-2-imidazolecarbonitrile, N-methyl-4-imidazolecarbonitrile, N-methyl-5-imidazolecarbonitrile, N-methyl-3-pyrazolecarbonitrile, N-methyl-4-pyrazolecarbonitrile, N-methyl-5-pyrazolecarbonitrile, N-methyl-1,2,3-triazole-4-carbonitrile, N-methyl-1,2,3-triazole-5-carbonitrile, N-methyl-1,2,4-triazole-3-carbonitrile, N-methyl-1,2,4-triazole-5-carbonitrile, 1,2,4-triazine-3-carbonitrile, 1,2,4-triazine-5-carbonitrile, 1,2,4-triazine-6-carbonitrile, 1,3,5-triazinecarbonitrile, N-methyl-2-pyrroline-2-carbonitrile, N-methyl-2-pyrroline-3-carbonitrile, N-methyl-2-pyrroline-4-carbonitrile, N-methyl-2-pyrroline-5-carbonitrile, N-methyl-3-pyrroline-2-carbonitrile, N-methyl-3-pyrroline-3-carbonitrile, N-methyl-2-imidazoline-2-carbonitrile, N-methyl-2-imidazoline-4-carbonitrile, N-methyl-2-imidazoline-5-carbonitrile, N-methyl-2-pyrazoline-3-carbonitrile, N-methyl-2-pyrazoline-4-carbonitrile, N-methyl-2-pyrazoline-5-carbonitrile, 2-quinolinecarbonitrile, 3-quinolinecarbonitrile, 4-quinolinecarbonitrile, 1-isoquinolinecarbonitrile, 3-isoquinolinecarbonitrile, 4-isoquinolinecarbonitrile, N-methylindole-2-carbonitrile, N-methylindole-3-carbonitrile, N-methylisoindole-1-carbonitrile, N-methylisoindole-3-carbonitrile, 1-indolizinecarbonitrile, 2-indolizinecarbonitrile, 3-indolizinecarbonitrile, 1-phthalazinecarbonitrile, 2-quinazolinecarbonitrile, 4-quinazolinecarbonitrile, 2-quinoxalinecarbonitrile, 3-cinnolinecarbonitlile, 4-cinnolinecarbonitlile, 1-methylindazole-3-carbonitlile, 1,5-naphthyridine-2-carbonitrile, 1,5-naphthyridine-3-carbonitrile, 1,5-naphthyridine-4-carbonitrile, 1,8-naphthyridine-2-carbonitrile, 1,8-naphthyridine-3-carbonitrile, 1,8-naphthyridine-4-carbonitrile, 2-pteridinecarbonitrile, 4-pteridinecarbonitrile, 6-pteridinecarbonitrile, 7-pteridinecarbonitrile, 1-methylbenzimidazole-2-carbonitrile, phenanthridine-6-carbonitrile, N-methyl-2-purinecarbonitrile, N-methyl-6-purinecarbonitrile, N-methyl-8-purinecarbonitrile, N-methyl-β-carboline-1-carbonitrile, N-methyl-β-carbonitrile-3-carbonitrile, N-methyl-β-carboline-4-carbonitrile, 9-acridinecarbonitrile, 1,7-phenanthroline-2-carbonitrile, 1,7-phenanthroline-3-carbonitrile, 1,7-phenanthroline-4-carbonitrile, 1,10-phenanthroline-2-carbonitrile, 1,10-phenanthroline-3-carbonitrile, 1,10-phenanthroline-4-carbonitrile, 4,7-phenanthroline-1-carbonitrile, 4,7-phenanthroline-2-carbonitrile, 4,7-phenanthroline-3-carbonitrile, 1-phenazinecarbonitrile, 2-phenazinecarbonitrile, 1-pyrrolidinecarbonitrile, and 1-piperidinecarbonitrile.

Examples of the compound having a heterocyclic group containing oxygen atom include 2-furonitrile, 3-furonitrile, 2-benzo[b]furancarbonitrile, 3-benzo[b]furancarbonitrile, isobenzo[b]furan-1-carbonitrile, isobenzo[b]furan-3-carbonitrile, naphtho[2,3-b]furan-2-carbonitrile, and naphtho[2,3-b]furan-3-carbonitrile.

Examples of the compound having a heterocyclic group containing sulfur atom include 2-thiophencarbonitrile, 3-thiophencarbonitrile, benzo[b]thiophen-2-carbonitrile, benzo[b]thiophen-3-carbonitrile, isobenzo[b]thiophen-1-carbonitrile, isobenzo[b]thiophen-3-carbonitrile, naphtho[2,3-b]thiophen-2-carbonitrile, and naphtho[2,3-b]thiophen-3-carbonitrile.

Examples of the compound having a heterocyclic group containing two more hetero atoms include 2-oxazolecarbonitrile, 4-oxazolecarbonitrile, 5-oxazolecarbonitrile, 3-isoxazolecarbonitrile, 4-isoxazolecarbonitrile, 5-oxazolecarbonitrile, 2-thiazolecarbonitrile, 4-thiazolecarbonitrile, 5-thiazolecarbonitrile, 3-isothiazolecarbonitrile, 4-isothiazolecarbonitrile, 5-isothiazolecarbonitrile, 1,2,3-oxazole-4-carbonitrile, 1,2,3-oxazole-5-carbonitrile, 1,3,4-oxazole-2-carbonitrile, 1,2,3-thiazole-4-carbonitrile, 1,2,3-thiazole-5-carbonitrile, 1,3,4-thiazole-2-carbonitrile, 2-oxazoline-2-carbonitrile, 2-oxazoline-4-carbonitrile, 2-oxazoline-5-carbonitrile, 3-isoxazolinecarbonitrile, 4-isoxazolinecarbonitrile, 5-isoxazolinecarbonitrile, 2-thiazoline-2-carbonitrile, 2-thiazoline-4-carbonitrile, 2-thiazoline-5-carbonitrile, 3-isothiazolinecarbonitrile, 4-isothiazolinecarbonitrile, 5-isothiazolinecarbonitrile, benzothiazole-2-carbonitrile, and 4-morpholinecarbonitrile.

Examples of the compound having two or more cyano groups include 2,3-pyridinedicarbonitrile, 2,4-pyridinedicarbonitrile, 2,5-pyridinedicarbonitrile, 2,6-pyridinedicarbonitrile, 3,4-pyridinedicarbonitrile, 2,4-pyrimidinecarbonitrile, 2,5-pyrimidinecarbonitrile, 4,5-pyrimidinecarbonitrile, 4,6-pyrimidinecarbonitrile, 2,3-pyradinecarbonitrile, 2,5-pyradinecarbonitrile, 2,6-pyradinecarbonitrile, 2,3-furandicarbonitrile, 2,4-furandicarbonitrile, 2,5-furandicarbonitrile, 2,3-thiophendicarbonitrile, 2,4-thiophendicarbonitrile, 2,5-thiophendicarbonitrile, N-methyl-2,3-pyrroledicarbonitrile, N-methyl-2,4-pyrroledicarbonitrile, N-methyl-2,5-pyrroledicarbonitrile, 1,3,5-triazine-2,4-dicarbonitrile, 1,2,4-triazine-3,5-dicarbonitrile, 3,2,4-triazine-3,6-dicarbonitrile, 2,3,4-pyridinetricarbonitrile, 2,3,5-pyridinetricarbonitrile, 2,3,6-pyridinetricarbonitrile, 2,4,5-pyridinetricarbonitrile, 2,4,6-pyridinetricarbonitrile, 3,4,5-pyridinetricarbonitrile, 2,4,5-pyrimidinetricarbonitrile, 2,4,6-pyrimidinetricarbonitrile, 4,5,6-pyrimidinetricarbonitrile, pyradinetricarbonitrile, 2,3,4-furantricarbonitrile, 2,3,5-furantricarbonitrile, 2,3,4-thiophentricarbonitrile, 2,3,5-thiophentricarbonitrile, N-methyl-2,3,4-pyrroletricarbonitrile, N-methyl-2,3,5-pyrroletricarbonitrile, 1,3,5-triazine-2,4,6-tricarbonitrile, and 1,2,4-triazine-3,5,6-tricarbonitrile.

Among these examples, 2-cyanopyridine(2-pyridinecarbonitrile), 3-cyanopyridine(3-pyridinecarbonitrile) and 4-cyanopyridine(4-pyridinecarbonitrile) are preferable.

In order to modify the butadiene-based polymer by the heterocyclic nitrile compound, it suffices to react the polymer with the heterocyclic nitrile compound. For example, the modifying method includes bringing 1,3-butadiene monomers and catalyst or initiator and optionally other monomers to a conjugated state to obtain polymerization mixture, and adding the heterocyclic nitrile compound thereto. The heterocyclic nitrile compound may be added to polymerization mixture in an activated state. Alternatively, reactive polymer formed by polymerization of 1,3-butadiene monomer may be reacted with the heterocyclic nitrile compound. Further alternatively, it is acceptable to add the heterocyclic nitrile compound to polymer mixture in an activated state and then add a functionalizing agent thereto.

The polymerization mixture thus obtained is cooled, has the solvent removed and is dried by the conventional methods, whereby a modified butadiene-based polymer is obtained. For example, polymer retrieved from polymer cement is mixed with a solvent and then the obtained polymer is dried by using a drier such as a drum drier. In this process, polymer may be directly retrieved from polymer cement dried by a drum drier. Content of volatile substances in the dried polymer thus obtained is to be 1 wt. % or less.

The structure of the modified butadiene-based polymer thus obtained varies depending on the conditions employed in adjusting reactive polymer, including types and contents of catalyst and initiator, and the conditions employed in reacting the reactive polymer with the heterocyclic nitrile compound, such as types and contents of the heterocyclic nitrile compound.

The modified butadiene-based polymer described above presumably has a structure represented by formula (X) or (Y) below.

In formulae (X) and (Y), A represents hydrogen atom or metal atom, which metal atom is derived from the catalyst described above. B represents single bond or $R_x$, and $R_x$ is synonymous with the aforementioned formula (W1) or (W2). θ is synonymous with the formula (W1) or (W2). θ' represents a divalent substitution group where one atom has been removed from θ. θ' may represent a structure where hydrogen atom or the like has been added to a hetero atom belonging θ. $\pi_1$ and $\pi_2$ represent polymer chains of the butadiene-based polymer, respectively.

It is assumed that, when the butadiene-based polymer having a structure as described above is exposed to water vapor or the like, the polymer is hydrolyzed and converted into a ketone-based structure represented by formula (X') or (Y') below.

In formulae (X') and (Y'), B, θ and θ' are synonymous with the formula (W1) or (W2), respectively. $\pi_1$ and $\pi_2$ represent polymer chains of the butadiene-based polymer, respectively.

It is assumed that, since the butadiene-based polymer can have such structures as described above, miscibility of the polymer with respect to fillers such as carbon black is improved and better low heat generation properties of the rubber composition can be realized.

The modifying agent may have components (a)-(h) below, other than the components described above. A rubber composition having excellent low heat generation properties can be obtained by using polymer modified by such a modifying agent as having components (a)-(h).

In the present invention, component (a) to be reacted with the butadiene-based polymer is a modifying agent as a halogenated organic metal compound or halogenated metal compound, represented by formula (V) below.

In formula (V), $R^6$ to $R^8$ are $C_{1-20}$ hydrocarbon groups, respectively, which may be the same or different from each other. $R^9$ is a $C_{1-20}$ hydrocarbon group which may have carbonyl or ester group in side chain thereof. M' represents one of tin atom, silicon atom, germanium atom and phosphor atom. Z represents halogen atom and "n" represents an integer from 0 to 3.

In formula (V) above, when M' represents tin atom, examples of component (a) include triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, tin tetrachloride, and the like.

In formula (V) above, when M' represents silicon atom, examples of component (a) include triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyldichlorosilane, dibutyldichlorosilane, dimethyldichlorosilane, methyldichlorosilane, phenylchlorosilane, hexyltrichlorosilane, octyltrichlorosilane, butyltrichlorosilane, methyltrichlorosilane, silicon tetrachloride, and the like.

In formula (V) above, when M' represents germanium atom, examples of component (a) include triphenylgermanium chloride, dibutylgermanium dichloride, diphenylgermanium dichloride, butylgermanium trichloride, germanium tetrachloride, and the like. In formula (V) above, when M' represents phosphor atom, examples of component (a) include phosphor trichloride, and the like.

Further, in the present invention, it is acceptable to use as component (a) for the modifying agent an organic metal compound having in molecule thereof ester group represented by formula (VI) or carbonyl group represented by formula (VII).

$R^7_n M'(-R^8-COOR^9)_{4-n}$, (VI)

$R^7_n M'(-R^8-COOR^9)_{4-n}$, (VII)

In formulae (VI) and (VII), $R^7$ and $R^8$ are $C_{1-20}$ hydrocarbon groups, respectively, which may be the same or different from each other. $R^9$ is a $C_{1-20}$ hydrocarbon group which may have carbonyl or ester group in side chain thereof. M' represents one of tin atom, silicon atom, germanium atom and phosphor atom and "n" represents an integer from 0 to 3.

The aforementioned respective components (a) may be used in combination at any desired ratio therebetween.

In the present invention, heterocumulene compound as component (b) to be reacted with the butadiene-based polymer is a modifying agent having a structure represented by formula (VIII) below.

Y=C=Y' bond (VIII)

In formula (VIII), Y represents one of carbon atom, oxygen atom, nitrogen atom and sulfur atom and Y' represents one of oxygen atom, nitrogen atom and sulfur atom.

In the present invention, the modifying agent is: a ketene compound in a case where Y and Y' of component (b) are carbon atom and oxygen atom, respectively; a thioketene compound in a case where Y is carbon atom and Y' is sulfur atom; an isocyanate compound in a case where Y is nitrogen atom and Y' is oxygen atom; a thioisocyanate compound in a case where Y is nitrogen atom and Y' is sulfur atom; a carbodiimide compound in a case where both Y and Y' are nitrogen atoms; carbon dioxide when both Y and Y' are oxygen atoms; a carbonyl sulfide in a case where Y is oxygen atom and Y' is sulfur atom; carbon disulfide when both Y and Y' are sulfur atoms. However, type of component (b) is not restricted to the combinations described above.

Examples of the ketene compound include ethylketene, butylketene, phenylketene, toluylketene, and the like. Examples of the thioketene compound include ethylenethioketene, butylthioketene, phenylthioketene, toluylthioketene, and the like. Examples of the isocyanate compound include phenyl isocyanate, 2,4-tolylenediisocyanate, 2,6-tolylenediisocyanate, diphenylmethane diisocyanate, polymeric diphenylmethane diisocyanate, hexamethylene diisocyanate, and the like. Examples of the thioisocyanate compound include phenylthioisocyanate, 2,4-tolylenedithioisocyanate, hexamethylene dithioisocyanate, and the like. Examples of the carbodiimide compound include N,N'-diphenylcarbodiimide, N,N'-ethylcarbodiimide.

In the present invention, hetero-3-membered ring compound as component (c) to be reacted with the butadiene-based polymer is a modifying agent having a structure represented by formula (I) below.

(I)

In formula (I), Y' represents one of oxygen atom, nitrogen atom and sulfur atom.

In the present invention, the modifying agent is: an epoxy compound in a case where Y' of component (c) is oxygen atom; an ethyleneimine derivative in a case where Y' is nitrogen; and a thiirane compound in a case where Y' is sulfur. In the present invention, examples of the epoxy compound include ethylene oxide, propylene oxide, cyclohexene oxide, styrene oxide, epoxydized soya bean oil, epoxidized natural rubber, and the like. Examples of ethyleneimine derivative include ethyleneimine, propyleneimine, N-phenylethyleneimine, N-(β-cyanoethyl)ethyleneimine, and the like. Examples of the thiirane compound include thiirane, methylthiirane, phenylthiirane, and the like.

In the present invention, halogenated isocyano compound as component (d) to be reacted with the butadiene-based polymer is a modifying agent having a structure represented by formula (IX) below.

—N=C—X bond (IX)

In formula (IX), X represents halogen atom.

Examples of the halogenated isocyano compound as component (d) include 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)pyrimidine, 2,4,5,6-tetrachloropyrimidine, 2,4,6-trichloropyrimidine, 2-amino-6-chloropyradine, 2,6-dichloropyradine, 2,4-bis(methylthio)-6-chloro-1,3,6-triazine, 2,4,6-trichloro-1,3,5-triazine, 2-bromo-5-nitrothiazole, 2-chlorobenzothiazole, 2-chlorobenzoxazole, and the like.

In the present invention, one of carboxylic acid, acid halide, ester compound, carbonate ester compound and acid anhydride as component (e) to be reacted with the butadiene-based polymer is a modifying agent having a structure represented by formulae (X) to (XIV) and (II) below.

$R^{10}-(COOH)_m$ (X)

$R^{11}(COZ)_m$, (XI)

$R^{12}-(COO-R^{13})$, (XII)

$R^{14}-OCOO-R^{15}$, (XIII)

$R^{16}-(COOCO-R^{17})$, (XIV)

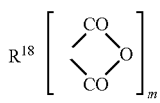
(II)

In formula (II), $R^{10}$ to $R^{18}$ are $C_{1-50}$ hydrocarbon groups, respectively, which may be the same or different from each other, Z is a halogen atom, and m is an integer in the range of 1 to 5.

In the present invention, examples of the carboxylic acid represented by formula (X) as component (e) include acetic acid, stearic acid, adipic acid, maleic acid, benzoic acid, acrylic acid, methacrylic acid, phthalic acid, isophalic acid, terephthalic acid, trimellitic acid, pyromellitic acid, mellitic acid, and products obtained by complete or partial hydrolysis of polymethacrylic acid ester compound/polyacrylic acid compound.

Examples of the acid halide represented by formula (XI) include acetyl chloride, propionyl chloride, butyryl chloride, isobutyryl chloride, octanoic acid chloride, acrylic acid chloride, benzoic acid chloride, stearic acid chloride, phthalic acid chloride, maleic acid chloride, oxalinic acid chloride, acetyl iodide, benzoyl iodide, acetyl fluoride, benzoyl fluoride, and the like.

Examples of the ester compound represented by formula (XII) include ethyl acetate, ethyl stearate, diethyl adipate, diethyl maleate, methyl benzoate, ethyl acrylate, ethyl methacrylate, diethyl phthalate, dimethyl terephthalate, tributyl trimellitate, tetraoctyl pyromellitate, hexaethyl mellitate, phenyl acetate, polymethyl methacrylate, polyethyl acrylate, polyisobutyl acrylate, and the like. Examples of the carbonate ester compound represented by formula (XIII) include dimethyl carbonate, diethyl carbonate, dipropyl carbonate, dihexyl carbonate, diphenyl carbonate, and the like.

Examples of the acid anhydride include: intermolecular acid anhydride represented by formula (XIV) such as acetic anhydride, propionic anhydride, isobutyric anhydride, isovaleric anhydride, heptanoic anhydride, benzoic anhydride, cinnamic anhydride, and the like; and intramolecular acid anhydride represented by formula (II) such as succinic anhydride, methylsuccinic anhydride, maleic anhydride, glutaric anhydride, citraconic anhydride, phthalic anhydride, styrene/maleic anhydride copolymer, and the like.

The aforementioned compounds exemplified as component (e) may contain non-protonic polar group such as ether group, tertiary amino group in coupling agent molecules unless presence of the polar group adversely affects the object of the present invention. The respective compounds exemplified as component (e) may be used either solely by one type or in combination of two or more types. Further, component (e) may contain as impurities compounds having free alcohol group and/or phenol group. Yet further, component (e) may be used either solely or as mixture with two or more types of the compounds having free alcohol group and/or phenol group. Yet further, component (e) may contain as impurities compounds having free alcohol group and/or phenol group.

In the present invention, the metal salt as component (f) to be reacted with the butadiene-based polymer is a modifying agent having a structure represented by formulae (XV) to (XVI) and (III) below.

(XV)

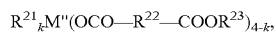
(XVI)

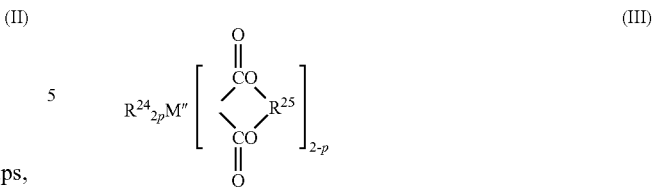
(III)

In formula (III), $R^{19}$ to $R^{25}$ are $C_{1-20}$ hydrocarbon groups, respectively, which may be the same or different from each other, M″ is one of tin atom, silicon atom and germanium atom, k is an integer in the range of 0 to 3, and p is 0 or 1.

Regarding component (f), examples of the compound represented by formula (XV) above include triphenyltin laurate, triphenyltin-2-ethylhexatate, triphenyltin naphthate, triphenyltin acetate, triphenyltin acrylate, tri-n-butyltin laurate, tri-n-butyltin-2-ethylhexatate, tri-n-butyltin naphthate, tri-n-butyltin acetate, tri-n-butyltin acrylate, tri-t-butyltin laurate, tri-t-butyltin-2-ethylhexatate, tri-t-butyltin naphthate, tri-t-butyltin acetate, tri-t-butyltin acrylate, triisobutyltin laurate, triisobutyltin-2-ethylhexatate, triisobutyltin naphthate, triisobutyltin acetate, triisobutyltin acrylate, triisopropyltin laurate, triisopropyltin-2-ethylhexatate, triisopropyltin naphthate, triisopropyltin acetate, triisopropyltin acrylate, trihexyltin laurate, trihexyltin-2-ethylhexatate, trihexyltin acetate, trihexyltin acrylate, trioctyltin laurate, trioctyltin-2-ethylhexatate, trioctyltin naphthate, trioctyltin acetate, trioctyltin acrylate, tri-2-ethylhexltin laurate, tri-2-ethylhexltin-2-ethylhexatate, tri-2-ethylhexltin naphthate, tri-2-ethylhexltin acetate, tri-2-ethylhexltin acrylate, tristearyltin laurate, tristearyltin-2-ethylhexatate, tristearyltin naphthapte, tristearyltin acetate, tristearyltin acrylate, tribenzyltin laurate, tribenzyltin-2-ethylhexatate, tribenzyltin naphthate, tribenzyltin acetate, tribenzyltin acrylate, diphenyltin dilaurate, diphenyltin-2-ethylhexatate, diphenyltin distearate, diphenyltin dinaphthate, diphenyltin diacetate, diphenyltin diacrylate, di-n-butyltin dilaurate, di-n-butyltin di-2-ethylhexatate, di-n-butyltin distearate, di-n-butyltin dinaphthate, di-n-butyltin diacetate, di-n-butyltin diacrylate, di-t-butyltin dilaurate, di-t-butyltin di-2-ethylhexatate, di-t-butyltin distearate, di-t-butyltin dinaphthate, di-t-butyltin diacetate, di-t-butyltin diacrylate, diisobutyltin dilaurate, diisobutyltin di-2-ethylhexatate, diisobutyltin distearate, diisobutyltin dinaphthate, diisobutyltin diacetate, diisobutyltin diacrylate, diisopropyltin dilaurate, diisopropyltin-2-ethylhexatate, diisopropyltin distearate, diisopropyltin dinaphthate, diisopropyltin diacetate, diisopropyltin diacrylate, dihexyltin dilaurate, dihexyltin di-2-ethylhexatate, dihexyltin distearate, dihexyltin dinaphthate, dihexyltin diacetate, dihexyltin diacrylate, di-2-ethylhexyltin dilaurate, di-2-ethylhexyltin-2-ethylhexatate, di-2-ethylhexyltin distearate, di-2-ethylhexyltin dinaphthate, di-2-ethylhexyltin diacetate, di-2-ethylhexyltin diacrylate, dioctyltin dilaurate, dioctyltin di-2-ethylhexatate, dioctyltin distearate, dioctyltin dinaphthate, dioctyltin diacetate, dioctyltin diacrylate, distearyltin dilaurate, distearyltin di-2-ethylhexatate, distearyltin distearate, distearyltin dinaphthate, distearyltin diacetate, distearyltin diacrylate, dibenzyltin dilaurate, dibenzyltin di-2-ethylhexatate, dibenzyltin distearate, dibenzyltin dinaphthate, dibenzyltin diacetate, dibenzyltin diacrylate, phenyltin trilaurate, phenyltin tri-2-ethylhexatate, phenyltin trinaphthate, phenyltin triacetate, phenyltin triacrylate, n-butyltin trilaurate, n-butyltin tri-2-ethylhexatate, n-butyltin trinaphthate, n-butyltin triacetate, n-butyltin triacrylate, t-butyltin trilaurate, t-butyltin tri-2-ethylhexatate, t-butyltin trinaphthate, t-butyltin triacetate, t-butyltin triacrylate, isobutyltin trilaurate, isobutyltin tri-2-ethylhexatate, isobutyltin trinaphthate, isobutyltin triacetate, isobutyltin triacrylate, isopropyltin trilaurate, isopropyltin tri-2-ethylhexatate, isopropyltin trinaphthate, isopropyltin triacetate, isopropyltin triacrylate, hexyltin trilaurate, hexyltin tri-2-ethylhexatate, hexyltin trinaphthate, hexyltin triacetate, hexyltin triacrylate, octyltin trilaurate, octyltin tri-2-ethylhexatate, octyltin trinaphthate, octyltin triacetate, octyltin triacrylate, 2-ethylhexyltin trilaurate, 2-ethylhexyltin tri-2-ethylhexatate, 2-ethylhexyltin trinaphthate, 2-ethylhexyltin triacetate, 2-ethylhexyltin triacrylate, stearyltin trilaurate, stearyltin tri-2-ethylhexatate, stearyltin trinaphthate, stearyltin triacetate, stearyltin triacrylate, benzyltin trilaurate, benzyltin tri-2-ethylhexatate, benzyltin trinaphthate, benzyltin triacetate, benzyltin triacrylate, and the like.

Regarding component (f), examples of the compound represented by formula (XVI) above include diphenyltin bis(methylmaleate), diphenyltin bis(2-ethylhexatate), diphenyltin bis(octylmaleate), diphenyltin bis(octylmaleate), diphenyltin bis(benzylmaleate), di-n-butyltin bis(methylmaleate), di-n-butyltin bis(2-ethylhexatate), di-n-butyltin bis(octylmaleate), di-n-butyltin bis(benzylmaleate), di-t-butyltin bis(methylmaleate), di-t-butyltin bis(2-ethylhexatate), di-t-butyltin bis(octylmaleate), di-t-butyltin bis(benzylmaleate), diisobutyltin bis(methylmaleate), diisobutyltin bis(2-ethylhexatate), diisobutyltin bis(octylmaleate), diisobutyltin bis(benzylmaleate), diisopropyltin bis(methylmaleate), diisopropyltin bis(2-ethylhexatate), diisopropyltin bis(octylmaleate), diisopropyltin bis(benzylmaleate), dihexyltin bis(methylmaleate), dihexyltin bis(2-ethylhexatate), dihexyltin bis(octylmaleate), dihexyltin bis(benzylmaleate), di-2-ethylhexltin bis(methylmaleate), di-2-ethylhexltin bis(2-ethylhexatate), di-2-ethylhexltin bis(octylmaleate), di-2-ethylhexltin bis(benzylmaleate), dioctyltin bis(methylmaleate), dioctyltin bis(2-ethylhexatate), dioctyltin bis(octylmaleate), dioctyltin bis(benzylmaleate), distearyltin bis(methylmaleate), distearyltin bis(2-ethylhexatate), distearyltin bis(octylmaleate), distearyltin bis(benzylmaleate), dibenzyltin bis(methylmaleate), dibenzyltin bis(2-ethylhexatate), dibenzyltin bis(octylmaleate), dibenzyltin bis(benzylmaleate), diphenyltin bis(methyladitate), diphenyltin bis(2-ethylhexatate), diphenyltin bis(octyladitate), diphenyltin bis(benzyladitate), di-n-butyltin bis(methyladitate), di-n-butyltin bis(2-ethylhexatate), di-n-butyltin bis(octyladitate), di-n-butyltin bis(benzyladitate), di-t-butyltin bis(methyladitate), di-t-butyltin bis(2-ethylhexatate), di-t-butyltin bis(octyladitate), di-t-butyltin bis(benzyladitate), diisobutyltin bis(methyladitate), diisobutyltin bis(2-ethylhexatate), diisobutyltin bis(octyladitate), diisobutyltin bis(benzyladitate), diisopropyltin bis(methyladitate), diisopropyltin bis(2-ethylhexatate), diisopropyltin bis(octyladitate), diisopropyltin bis(benzyladitate), dihexyltin bis(methyladitate), dihexyltin bis(2-ethylhexatate), dihexyltin bis(methyladitate), (dihexyltin bis(octyladitate)), dihexyltin bis(benzyladitate), di-2-ethylhexyltin bis(methyladitate), di-2-ethylhexyltin bis(2-ethylhexatate), di-2-ethylhexyltin bis(octyladitate), di-2-ethylhexyltin bis(benzyladitate), dioctyltin bis(methyladitate), dioctyltin bis(2-ethylhexatate), dioctyltin bis(octyladitate), dioctyltin bis(benzyladitate), distearyltin bis(methyladitate), distearyltin bis(2-ethylhexatate), distearyltin bis(octyladitate), distearyltin bis(benzyladitate), dibenzyltin bis(methyladitate), dibenzyltin bis(2-ethylhexatate), disbenzyltin bis(octyladitate), dibenzyltin bis(benzyladitate), and the like.

Further, examples of the compound represented by formula (III) above include diphenyltin maleate, di-n-butyltin maleate, di-t-butyltin maleate, diisobutyltin maleate, diisopropyltin maleate, dihexyltin maleate, di-2-ethylhexyltin maleate, dioctyltin maleate, distearyltin maleate, dibenzyltin maleate, diphenyltin aditate, butyltin aditate, di-t-butyltin aditate, diisobutyltin aditate, diisopropyltin aditate, dihexyltin aditate, di-2-ethylhexyltin aditate, dioctyltin aditate, distearyltin aditate, dibenzyltin aditate, and the like.

In the present invention, component (g) to be reacted with the butadiene-based polymer is a modifying agent composed of one of N-substituted aminoketone, N-substituted aminothioketone, N-substituted aminoaldehyde, N-substituted aminothioaldehyde, and a compound having in the molecule thereof —C-(=M)-N< bond (M represents oxygen atom or sulfur atom).

Examples of component (g) include: N-substituted aminoketones such as 4-(dimethylamino)acetophenone, 4-(diethylamino)acetophenone, 1,3-bis(diphenylamino)-2-propanone, 1,7-bis(methylethylamino)-4-heptanone, 4-(dimethylamino)benzophenone, 4-(diethylamino)benzophenone, 4-(di-t-butylamino)benzophenone, 4-(diphenylamino)benzophenone, 4,4'-bis(dimethylamino)benzophenone, 4,4'-bis(diethylamino)benzophenone, 4,4'-bis(diphenylamino)benzophenone; N-aminothioketones corresponding the aforementioned N-substituted aminoketones; N-substituted aminoaldehydes such as 4-dimethylaminobenzaldehyde, 4-diphenylaminobenzaldehyde, 4-vinylaminobenzaldehyde; N-aminothioaldehydes corresponding the aforementioned N-substituted aminoaldehydes; and compounds each having in the molecule thereof —C—(=Y$^1$)—N< bond (Y$^1$ represents oxygen atom or sulfur atom), such as: N-substituted lactams like N-methyl-β-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone, N-methyl-ε-caprolactam, N-phenyl-ε-caprolactam, N-methyl-ω-caprolactam, N-phenyl-ω-caprolactam, N-methyl-ω-laurylolactam, N-vinyl-ω-laurylolactam; N-substituted thiolactams corresponding to the aforementioned N-substituted lactams; N-substituted cyclic ureas like 1,3-dimethylethylene urea, 1,3-divinylethylene urea, 1,3-diethyl-2-imidazolidinone, 1-methyl-3-ethyl-2-imidazolidinone, 1,3-dimethyl-2-imidazolidinone; and N-substituted cyclic thioureas corresponding to the aforementioned N-substituted cyclic ureas.

In the present invention, component (h) to be reacted with the butadiene-based polymer is a modifying agent represented by general formula (IV).

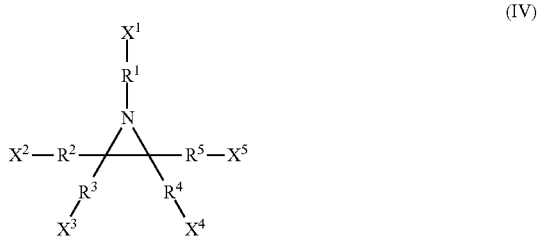

(IV)

In formula (IV), $X^1$ to $X^5$ each represents hydrogen atom or a functional group having at least one type selected from the group consisting of halogen atom, carbonyl group, thiocarbonyl group, isocyanate group, thioisocyanate group, epoxy group, thioepoxy group, halogenated silyl group, hydrocarvyloxysilyl group, and sulphonyloxy group; $X^1$ to $X^5$ may be the same or different from each other, but at least one of them is not hydrogen atom.

$R^1$ to $R^5$ each independently represent a single bond or a divalent $C_{1-18}$ hydrocarbon group. Examples of such a divalent $C_{1-18}$ hydrocarbon group include $C_{1-18}$ alkylene group, $C_{2-18}$ alkenylene group, $C_{6-18}$ arylene group, $C_{7-18}$ aralkylene group, and the like. Among these examples, $C_{1-18}$ alkylene group, in particular, $C_{1-10}$ alkylene group is preferable. The alkylene group may be either normal, branched or cyclic but preferably normal. Examples of the normal alkylene group include methylene, ethylene, trimethylene, tetramethylene, pentamethylene, hexamethylene, octamethylene, decamethylene, and the like.

Plural aziridine rings may be bonded by way of any of $X^1$ to $X^5$ and $R^1$ to $R^5$. In the modifying agent represented by general formula (IV), it is preferable that $X^1$ is not hydrogen atom and $R^1$ is not single bond.

Examples of the modifying agent represented by general formula (IV) include 1-acetylaziridine, 1-propionylaziridine, 1-butylaziridine, 1-isobutylaziridine, 1-valerylaziridine, 1-isovalerylaziridine, 1-pivaloylaziridine, 1-acetyl-2-methylaziridine, 2-methyl-1-propionylaziridine, 1-butyl-2-methylaziridine, 2-methyl-1-isobutylaziridine, 2-methyl-1-valerylaziridine, 1-isovaleryl-2-methylaziridine, 2-methyl-1-pivaloylaziridine, ethyl 3-(1-aziridinyl)propionate, propyl 3-(1-aziridinyl)propionate, butyl 3-(1-aziridinyl)propionate, ethylene glycol bis[3-(1-aziridinyl)propionate], trimethyrol propane tris[3-(1-aziridinyl)propionate], ethyl 3-(2-methyl-1-aziridinyl)propionate, propyl 3-(2-methyl-1-aziridinyl)propionate, butyl 3-(2-methyl-1-aziridinyl)propionate, ethylene glycol bis[3-(2-methyl-1-aziridinyl)propionate], trimethyrol propane tris[3-(2-methyl-1-aziridinyl)propionate], neopentyl glycol bis[3-(1-aziridinyl)propionate], neopentyl glycol bis[3(2-methyl-1-aziridinyl)propionate], di(1-aziridinylcarbonyl)methane, 1,2-di(1-aziridinylcarbonyl)ethane, 1,3-di(1-aziridinylcarbonyl)propane, 1,4-di(1-aziridinylcarbonyl)butane, 1,5-di(1-aziridinylcarbonyl)pentane, di(2-methyl-1-aziridinylcarbonyl)methane, 1,2-di(2-methyl-1-aziridinylcarbonyl)ethane, 1,3-di(2-methyl-1-aziridinylcarbonyl)propane, 1,4-di(2-methyl-1-aziridinylcarbonyl)butane, and the like, without being limited thereto. The aforementioned components (a)-(h) as the modifying agent may be used either solely by one type or in combination of two or more types.

[Rubber Composition]

The rubber composition of the present invention includes, in 100 mass % of rubber components, 20 to 80 mass %, preferably 30 to 70 mass %, of the aforementioned natural rubber and the aforementioned butadiene-based polymer as the remainder. The content of the butadiene-based polymer is preferably 80 to 20 mass %, more preferably 70 to 30 mass %, with respect to 100 mass % of the rubber components. The superior effects caused by the natural rubber and the butadiene-based polymer in combination can be sufficiently demonstrated by setting the contents of the natural rubber and the butadiene-based polymer within the aforementioned ranges, respectively.

Additives conventionally used in rubber industries such as vulcanizing agent, vulcanization accelerator, anti-oxidant, anti-scorching agent, softener, zinc oxide, stearic acid, and silane coupling agent may be appropriately selected and blended with the aforementioned rubber components and fillers of the rubber composition unless addition of the additives adversely affects the object of the present invention. Commercially available products can be suitably used as these additives. The rubber composition can be produced by blending the rubber components with additives of various types appropriately selected according to necessity and then subjecting the mixture to kneading, warming, extrusion, and the like.

In a case where a filler is blended, the filler is blended such that the content thereof is preferably 30 to 70 mass parts, more preferably 30 to 50 mass parts, with respect to 100 parts of the rubber components. Carbon black or silica, or blended mixture thereof, can be used as the filler. Although there is no particular restriction on carbon black, it is preferable that carbon black is added such that a specific surface area by nitrogen adsorption (N2SA) thereof is in the range of 20 to 180 m$^2$/g. The N2SA is more preferably in the range of 20 to 100 m$^2$/g. Carbon black having N2SA in the range of 20 to 180 m$^2$/g has relatively large particle diameter and achieves a very good effect of improving low heat generation properties of the rubber composition. Specific examples of such preferable carbon black include those of HAF grade or lower, such as HAF, FF, FEF, GPF, SRF, FT grades. HAF, FEF and GPF grades are particularly preferable in terms of improving resistance to crack growth.

[Tire]

The aforementioned rubber composition of the present invention can be used in a member of a tire and such a tire using the rubber composition of the present invention exhibits good heat resistance properties and resistance to crack growth. There is no particular restriction on the tire as long as the rubber composition is used in a member thereof such as tread, sidewall, and the like. The tire can be produced by the conventional method.

EXAMPLES

The present invention will be described in detail hereinafter by Examples below. The present invention is not restricted to these Examples.

Respective physical properties of the butadiene-based polymer are measured according to the methods described below.

<Micro Structure: Content of [cis-1,4 Bond (%); Content of 1,2-Vinyl Bond (%)>

These micro structures are analyzed by infrared spectroscopy (Morero's method) using a Fourier transform infrared spectrophotometer (FT/IR-4100, manufactured by JASCO Corporation).

<Molecular Weight Distribution of Butadiene-Based Polymer (Mw/Mn)>

Molecular weight distribution of butadiene-based polymer (Mw/Mn) is measured under the conditions described below and calculated in terms of polystyrene standards, by using gel permeation chromatography (Product name "HLC-8120GPC", manufactured by TOSOH Corporation) and a refractive index detector as a detection device.

Column: Product name "GMH-XL" manufactured by TOSOH Corporation×2

Column temperature: 40° C.

Mobile phase: Tetrahydrofuran

Flow rate: 1.0 ml/min.

Sample concentration: 10 mg/20 ml

[Production of Polymer A]

A 5 L autoclave is firstly flushed with nitrogen and then 2.4 kg of cyclohexane and 300 g of 1,3-butadiene are charged into the autoclave under nitrogen atmosphere. A catalyst composition is prepared in advance by reacting a cyclohexane solution of neodymium versatate (0.09 mmol), a toluene solution of methylaluminoxane (MAO, 3.6 mmol), diisobutylaluminum hydride (DIBAH, 5.5 mmol) and a toluene solution of ethylaluminum chloride (0.18 mmol) as catalyst components with 1,3-butadiene (4.5 mmol) and leaving the reactants to complete the reaction at 40° C. for 30 minutes. The catalyst composition thus prepared is charged into the autoclave and polymerization is carried out at 60° C. for 60 minutes. The conversion rate of 1,3-butadiene in the reaction is substantially 100%. 200 g of the polymer solution is mixed with a methanol solution containing 0.2 g of 2,4-di-tert-butyl-p-cresol to stop polymerization. The mixture has the solvents removed by steam stripping and then is dried on a roll at 110° C., whereby polymer A (conjugated diene-based polymer) prior to modification is obtained. The content of cis-1,4 bond of polymer A thus obtained is 96.3%, the content of 1,2-vinyl bond is 0.62%, and Mw/Mn=1.8.

[Production of Polymer B]

A polymer solution is prepared in the same manner as in the production of polymer A described above. A toluene solution of 2-cyanopyridine (4.16 mmol) is added to the polymer solution, while the temperature of the polymer solution is kept at 60° C., and the reaction (the primary modification reaction) is allowed to proceed for 15 minutes. Thereafter, 200 g of the resulting polymer solution is mixed with a methanol solution containing 1.3 g of 2,4-di-tert-butyl-p-cresol to stop polymerization. The mixture has the solvents removed by steam stripping and then is dried on a roll at 110° C., whereby polymer B (modified conjugated diene-based polymer) is obtained. The content of cis-1,4 bond of polymer B thus obtained is 96.1%, the content of 1,2-vinyl bond is 0.61%, and Mw/Mn=2.2.

[Production of Polymer C]

An approximately 1 L-volume, rubber-capped glass vessel is dried and flushed with nitrogen. A cyclohexane solution of dry-purified butadiene and dried cyclohexane are charged into the glass vessel, respectively, to realize a state where 400 g of a cyclohexane solution of butadiene (butadiene concentration: 12.0 mass %) has been charged in the glass vessel. Next, 0.30 ml of n-butyllithium (1.57 M) and 0.185 mL of 2,2-di(2-tetrahydrofuryl)propane (0.2 N) are added to the butadiene solution and polymerization is carried out in a water bath at 50° C. for 1.5 hours. 0.84 mmol of 2-cyanopyridine is added to the polymer solution, while the temperature of the polymer solution is kept at 50° C., and the reaction is allowed to proceed for 15 minutes. Thereafter, 200 g of the resulting polymer solution is mixed with a methanol solution containing 1.3 g of 2,4-di-tert-butyl-p-cresol to stop polymerization. The mixture has the solvents removed by steam stripping and then is dried on a roll at 110° C., whereby polymer C (diene-based polymer) is obtained. The content of cis-1,4 bond of polymer C thus obtained is 45.3%, the content of 1,2-vinyl bond is 18.4%, and Mw/Mn=1.2.

[Production of Polymer D]

A polymer solution is prepared in the same manner as in the production of polymer A described above. A toluene solution of 4,4'-dihydronaphthoquinone (4.16 mmol) is added to the polymer solution, while the temperature of the polymer solution is kept at 60° C., and the reaction (the primary modification reaction) is allowed to proceed for 15 minutes. Thereafter, 200 g of the resulting polymer solution is mixed with a methanol solution containing 1.3 g of 2,4-di-tert-butyl-p-cresol to stop polymerization. The mixture has the solvents removed by steam stripping and then is dried on a roll at 110° C., whereby polymer D (modified conjugated diene-based polymer) is obtained. The content of cis-1,4 bond of polymer D thus obtained is 96.1%, the content of 1,2-vinyl bond is 0.63%, and Mw/Mn=2.3.

[Production of Polymer E]

A 100 mL-volume, rubber-capped glass vessel is dried and flushed with nitrogen. 7.11 g of a cyclohexane solution of butadiene (15.2 mass %), 0.59 mL of a cyclohexane solution of neodymium neodecanoate (0.56 M), 10.32 mL of a toluene solution of methylalminoxane MAO ("PMAO" manufactured by TOSOH Corporation, aluminum concentration: 3.23 M), and 7.77 mL of a hexane solution of diisobutylaluminum hydride (0.90 M, manufactured by Kanto Chemical Co., Inc.) are charged into the vessel and the reactants are left at the room temperature for 4 minutes to complete the reaction. Thereafter, 2.36 mL of a hexane solution of diethylaluminum chloride (0.95 M, manufactured by Kanto Chemical Co., Inc.) is added and the mixture is left, while being stirred occasionally, at the room temperature for 15 minutes to complete the reaction. The concentration of neodymium in the catalyst solution thus obtained is 0.011 M (mol/L).

An approximately 1 L-volume, rubber-capped glass vessel is dried and flushed with nitrogen. A cyclohexane solution of dry-purified butadiene and dried cyclohexane are charged into the glass vessel, respectively, to realize a state where 40 g of a cyclohexane solution of butadiene (butadiene concentration: 5 mass %) has been charged in the glass vessel. Next, the catalyst solution prepared in advance as described above is charged into the glass vessel and polymerization is carried out in a water bath at 10° C. for 4 hours. Thereafter, 2 mL of 5% isopropanol solution of anti-oxidant 2,2-methylene-bis (4-ethyl-6-t-butylphenol) (NS-5) is added to the polymer solution at 50° C. to stop polymerization and the polymer is reprecipitated in isopropanol containing a small amount of NS-5. The reprecipitate is dried on a drum, whereby polymer E is obtained at the yield of substantially 100%. The content of cis-1,4 bond of polymer E thus obtained is 99.0%, the content of 1,2-vinyl bond is 0.14%, and Mw/Mn=2.0.

[Production of Polymer F]

A polymer solution is prepared in the same manner as in the production of polymer E described above. A toluene solution of 2-cyanopyridine (4.16 mmol) is added to the polymer solution, while the temperature of the polymer solution is kept at 60° C., and the reaction (the primary modification reaction) is allowed to proceed for 15 minutes. Thereafter, 200 g of the resulting polymer solution is mixed with a methanol solution containing 1.3 g of 2,4-di-tert-butyl-p-cresol to stop polymerization. The mixture has the solvents removed by steam stripping and then is dried on a roll at 110° C., whereby polymer F (modified conjugated diene-based polymer) is obtained. The content of cis-1,4 bond of polymer F thus obtained is 99.0%, the content of 1,2-vinyl bond is 0.15%, and Mw/Mn=2.3.

[Production of Polymer G]

A polymer solution is prepared in substantially the same manner as in the production of polymer A, except that polymerization is carried out at 80° C. A toluene solution of 2-cyanopytidine (4.16 mmol) is added to the polymer solution, while the temperature of the polymer solution is kept at 80° C., and the reaction (the primary modification reaction) is allowed to proceed for 15 minutes. Thereafter, 200 g of the resulting polymer solution is mixed with a methanol solution containing 1.3 g of 2,4-di-tert-butyl-p-cresol to stop polymerization. The mixture has the solvents removed by steam stripping and then is dried on a roll at 110° C., whereby polymer G (modified conjugated diene-based polymer) is obtained. The content of cis-1,4 bond of polymer G thus obtained is 93.0%, the content of 1,2-vinyl bond is 0.85%, and Mw/Mn=1.9.

[Production of Natural Rubber (NR-1)]

Natural rubber latex (GT-1) to which 0.4 mass % ammonium has been added is concentrated by 15-munite centrifugal separation at 7500 rpm using a latex separator "SLP-3000" manufactured by Saito Separator Ltd. The concentrated latex is further subjected to centrifugal separation for 15 minutes at 7500 rpm. The concentrated latex thus obtained is diluted such that the latex as the solid component is approximately 20% of the solution. Formic acid is added to the latex solution and the mixture is left overnight. The rubber component obtained by coagulation of the mixture is dried at 110° C. for 210 minutes, whereby NR-1 is produced. The total nitrogen content of the rubber thus obtained is 0.15 mass % and non-rubber component is 0.3 mass %. The total nitrogen content of the rubber is calculated by: acid-coagulating and drying the latex to obtain a solid component (sample); precisely weighing the solid component and measuring the total nitrogen content by Kjeldahl method to obtain the nitrogen content (mass %) with respect to the solid component.

Comparative Examples 1 to 5, Examples 1 to 10

Each rubber composition was prepared according to the blending prescription shown in Table 1. A vulcanized rubber was then obtained by vulcanizing the rubber composition at 145° C. for 33 minutes. Resistance to crack generation and low heat generation properties (3% tan δ) of the vulcanized rubber were measured, respectively, according to the methods described below. The results are shown in Tables 2 to 4.

<Crack Growth Resistance>

A crack of 0.5 mm width is formed at the center of a JIS No. 3 test piece and the test piece is subjected to fatigue repeatedly at the room temperature under 50 to 100% strain. The number of fatigue stress imparted prior to fracture of the sample is counted at each strain value, and the average of the numbers counted at the respective strain values is calculated. In Table 2, the values of crack growth resistance of samples of Examples and Comparative Examples, each blended with carbon black having the same N2SA, are expressed by indices with the value of crack growth resistance in Comp. Example 1 where polymer A is blended being 100. In Table 3, the values of crack growth resistance are expressed by indices with the value of crack growth resistance in Comp. Example 4 being 100. In Table 4, the values of crack growth resistance are expressed by indices with the value of crack growth resistance in Comp. Example 5 being 100. The larger index value represents the better resistance to crack growth.

<Low Heat Generation Properties (3% tan δ)>

Low heat generation properties of each sample is measured by using a dynamic spectrometer (manufactured by Rheometrix Corporation) under the conditions of tensile dynamic strain: 3%, frequency: 15 Hz and, temperature: 50° C. In Table 2, the values of low heat generation properties of samples of Examples and Comparative Examples, each blended with carbon black having the same N2SA, are expressed by indices with the value of low heat generation properties in Comp. Example 1 where polymer A is blended being 100. In Table 3, the values of low heat generation properties are expressed by indices with the value of low heat generation properties in Comp. Example 4 being 100. In Table 4, the values of low heat generation properties are expressed by indices with the value of low heat generation properties in Comp. Example 5 being 100. The larger index value represents the better low heat generation properties.

TABLE 1

| | Blended substances | Part by mass |
|---|---|---|
| First stage (Rubber compound prior to addition of sulfur, vulcanization accelerator, etc.) | Natural rubber[*1] | 50.0 |
| | Butadiene-based polymer[*2] | 50.0 |
| | Carbon black[*3] | 50.0 |
| | Stearic acid | 2.0 |
| | Anti-oxidant 6C[*4] | 3.5 |
| Second stage (Rubber compound after addition of sulfur, vulcanization accelerator, etc.) | Zinc white | 3.0 |
| | Anti-oxidant 6C[*5] | 1.0 |
| | Vulcanization accelerator CZ-G[*6] | 0.4 |
| | Vulcanization accelerator CZ-G[*7] | 0.2 |
| | Sulfur | 1.4 |

[*1]NR-1 or NR-2 (natural rubber-based, RSS#3 masticated rubber having the total nitrogen content: 0.42 mass %) are used. The type of the natural rubber used in Examples and Comp. Examples are shown in Tables 2 to 4.
[*2]Polymers A-G are used. The type of the polymer used in Examples and Comp. Examples are shown in Tables 2 to 4.
[*3]N2SA values of carbon black used in Examples and Comp. Examples are shown in Tables 2 to 4.
[*4]N-(1,3-dimethylbutyl)-N'-p-phenylenediamine, "NOCRAC 6C" manufactured by Ouchi Shinko Chimikcal Industial Co., Ltd.)
[*5]2,2,4-trimethyl-1,2-dihydroquinoline polymer, "NOCRAC 224" manufactured by Ouchi Shinko Chimikcal Industial Co., Ltd.)
[*6]N-cyclohexyl-2-benzothiazolylsulfenamide, "NOCCELAR CZ-G" manufactured by Ouchi Shinko Chimikcal Industial Co., Ltd.)
[*7]Dibenzothiazyldisulfide, "NOCCELAR DM-P" manufactured by Ouchi Shinko Chimikcal Industial Co., Ltd.)

TABLE 2

| | | Comp. Ex. 1 | Comp. Ex. 2 | Comp. Ex. 3 | Example 1 | Example 2 | Example 3 | Example 4 | Example 5 | Example 6 |
|---|---|---|---|---|---|---|---|---|---|---|
| Natural rubber | Type | NR-2 | NR-2 | NR-1 | NR-1 | NR-1 | NR-1 | NR-1 | NR-1 | NR-1 |
| | Total nitrogen content (mass %) | 0.42 | 0.42 | 0.15 | 0.15 | 0.15 | 0.15 | 0.15 | 0.15 | 0.15 |
| Type of butadiene-based polymer | | Polymer A | Polymer B | Polymer C | Polymer G | Polymer A | Polymer D | Polymer B | Polymer E | Polymer F |
| Modifying group | | — | 2-cyanopyridine | — | 2-cyanopyridine | — | 4,4-dihydronaphthoquinone | 2-cyanopyridine | — | 2-cyanopyridine |
| Cis content | | 96.2 | 96.1 | 45.3 | 93.0 | 96.2 | 96.1 | 96.1 | 99.0 | 99.0 |
| Vinyl content | | 0.62 | 0.61 | 18.4 | 0.85 | 0.62 | 0.63 | 0.61 | 0.14 | 0.15 |
| N2SA ($m^2/g$) of carbon black | | 42 | 42 | 42 | 42 | 42 | 42 | 42 | 42 | 42 |
| Crack growth resistance (index) | | 100 | 125 | 73 | 118 | 110 | 132 | 135 | 148 | 167 |
| 3% tan δ (index) | | 100 | 65 | 58 | 70 | 95 | 83 | 60 | 93 | 58 |

TABLE 3

|  |  | Comp. Ex. 4 | Example 7 | Example 8 |
|---|---|---|---|---|
| Natural rubber | Type | NR-2 | NR-1 | NR-1 |
|  | Total nitrogen content (mass %) | 0.42 | 0.15 | 0.15 |
| Type of butadiene-based polymer | | Polymer A | Polymer A | Polymer B |
| Modifying group | | — | — | 2-cyanopyridine |
| Cis content | | 96.2 | 96.2 | 96.1 |
| Vinyl content | | 0.62 | 0.62 | 0.61 |
| N2SA ($m^2$/g) of carbon black | | 78 | 78 | 78 |
| Crack growth resistance (index) | | 100 | 107 | 130 |
| 3% tanδ (index) | | 100 | 96 | 68 |

TABLE 4

|  |  | Comp. Ex. 5 | Example 9 | Example 10 |
|---|---|---|---|---|
| Natural rubber | Type | NR-2 | NR-1 | NR-1 |
|  | Total nitrogen content (mass %) | 0.42 | 0.15 | 0.15 |
| Type of butadiene-based polymer | | Polymer A | Polymer A | Polymer B |
| Modifying group | | — | — | 2-cyanopyridine |
| Cis content | | 96.2 | 96.2 | 96.1 |
| Vinyl content | | 0.62 | 0.62 | 0.61 |
| N2SA ($m^2$/g) of carbon black | | 145 | 145 | 145 |
| Crack growth resistance (index) | | 100 | 104 | 125 |
| 3% tanδ (index) | | 100 | 97 | 73 |

Comparative Examples 6-8, Example 11

Each rubber composition was prepared according to the blending prescription shown in Table 5. A vulcanized rubber was then obtained by vulcanizing the rubber composition at 145° C. for 33 minutes. Resistance to crack generation and low heat generation properties (3% tan δ) of the vulcanized rubber were measured, respectively, in the same manner as in the foregoing Comp. Examples and Examples. In Comp. Examples 6 and 7, the values of crack growth resistance and low heat generation properties are expressed by indices with the value of crack growth resistance and low heat generation properties in Comp. Example 6 being 100. In Comp. Example 8 and Example 11, the values of crack growth resistance and low heat generation properties are expressed by indices with the value of crack growth resistance and low heat generation properties in Comp. Example 8 being 100. The results are shown in Table 6.

Comparative Examples 9-11, Example 12

Each rubber composition was prepared according to the blending prescription shown in Table 5. A vulcanized rubber was then obtained by vulcanizing the rubber composition at 145° C. for 33 minutes. Resistance to crack generation and low heat generation properties (3% tan δ) of the vulcanized rubber were measured, respectively, in the same manner as in the foregoing Comp. Examples and Examples. In Comp. Examples 9 and 10, the values of crack growth resistance and low heat generation properties are expressed by indices with the value of crack growth resistance and low heat generation properties in Comp. Example 9 being 100. In Comp. Example 11 and Example 12, the values of crack growth resistance and low heat generation properties are expressed by indices with the value of crack growth resistance and low heat generation properties in Comp. Example 11 being 100. The results are shown in Table 7.

TABLE 5

| | Blended substances | Comp. Exs. 6-7 Parts by weight | Comp. Ex. 8 and Ex. 11 Parts by weight | Comp. Exs. 9-10 Parts by weight | Comp. Ex. 11 and Ex. 12 Parts by weight |
|---|---|---|---|---|---|
| First stage (Rubber compound prior to addition of sulfur, vulcanization accelerator, etc.) | Natural rubber[1] | 10.0 | 20.0 | 90.0 | 80.0 |
| | Butadiene-based polymer[2] | 90.0 | 80.0 | 10.0 | 20.0 |
| | Carbon black[3] | 50.0 | 50.0 | 50.0 | 50.0 |
| | Stearic acid | 2.0 | 2.0 | 2.0 | 2.0 |
| | Anti-oxidant 6C[4] | 3.5 | 3.5 | 3.5 | 3.5 |
| Second stage (Rubber compound | Zinc white | 3.0 | 3.0 | 3.0 | 3.0 |
| | Anti-oxidant 6C[5] | 1.0 | 1.0 | 1.0 | 1.0 |

TABLE 5-continued

|  | Blended substances | Comp. Exs. 6-7 Parts by weight | Comp. Ex. 8 and Ex. 11 Parts by weight | Comp. Exs. 9-10 Parts by weight | Comp. Ex. 11 and Ex. 12 Parts by weight |
|---|---|---|---|---|---|
| after addition of sulfur, vulcanization accelerator, etc.) | Vulcanization accelerator CZ-G*6 | 0.4 | 0.4 | 0.4 | 0.4 |
|  | Vulcanization accelerator CZ-G*7 | 0.2 | 0.2 | 0.2 | 0.2 |
|  | Sulfur | 1.4 | 1.4 | 1.4 | 1.4 |

*1NR-1 or NR-2 (natural rubber-based, RSS#3 masticated rubber having the total nitrogen content: 0.42 mass %) are used. The type of the natural rubber used in Examples and Comp. Examples are shown in Tables 6 and 7.
*2Polymers A
*3N2SA of the carbon black used in Examples and Comp. Examples are shown in Tables 6 and 7.
*4N-(1,3-dimethylbutyl)-N'-p-phenylenediamine, "NOCRAC 6C" manufactured by Ouchi Shinko Chimikcal Industrial Co., Ltd.)
*52,2,4-trimethyl-1,2-dihydroquinoline polymer, "NOCRAC 224" manufactured by Ouchi Shinko Chimikcal Industrial Co., Ltd.)
*6N-cyclohexyl-2-benzothiazolylsulfenamide, "NOCCELAR CZ-G" manufactured by Ouchi Shinko Chimikcal Industial Co., Ltd.)
*7Dibenzothiazyldisulfide, "NOCCELAR DM-P" manufactured by Ouchi Shinko Chimikcal Industial Co., Ltd.)

TABLE 6

|  |  | Comp. Ex. 6 | Comp. Ex. 7 | Comp. Ex. 8 | Example 11 |
|---|---|---|---|---|---|
| Natural rubber | Type | NR-2 | NR-1 | NR-2 | NR-1 |
|  | Total nitrogen content (mass %) | 0.42 | 0.15 | 0.42 | 0.15 |
| Type of butadiene-based polymer |  | Polymer A | Polymer A | Polymer A | Polymer A |
| Modifying group |  | — | — | — | — |
| Cis content |  | 96.2 | 96.2 | 96.2 | 96.2 |
| Vinyl content |  | 0.62 | 0.62 | 0.62 | 0.62 |
| N2SA ($m^2/g$) of carbon black |  | 42 | 42 | 42 | 42 |
| Crack growth resistance (index) |  | 100 | 102 | 100 | 106 |
| 3% tanδ (index) |  | 100 | 99 | 100 | 97 |

TABLE 7

|  |  | Comp. Ex. 9 | Comp. Ex. 10 | Comp. Ex. 11 | Example 12 |
|---|---|---|---|---|---|
| Natural rubber | Type | NR-2 | NR-1 | NR-2 | NR-1 |
|  | Total nitrogen content (mass %) | 0.42 | 0.15 | 0.42 | 0.15 |
| Type of butadiene-based polymer |  | Polymer A | Polymer A | Polymer A | Polymer A |
| Modifying group |  | — | — | — | — |
| Cis content |  | 96.2 | 96.2 | 96.2 | 96.2 |
| Vinyl content |  | 0.62 | 0.62 | 0.62 | 0.62 |
| N2SA ($m^2/g$) of carbon black |  | 42 | 42 | 42 | 42 |
| Crack growth resistance (index) |  | 100 | 100 | 100 | 106 |
| 3% tanδ (index) |  | 100 | 99 | 100 | 96 |

From the results shown in Table 2, it is understood that the rubber compositions of Examples 1-6, in which the natural rubber and the butadiene-based polymer having the cis content of 90% or more specifically prescribed by the present invention are blended, exhibit improvement in both crack growth resistance and low heat generation properties, as compared with the rubber compositions of Comp. Examples 1 and 2 each containing the butadiene-based polymer having the cis content of 90% or more blended therein but using conventional natural rubbers. Further, the rubber compositions of Examples 1 to 6 exhibit similar improvement, as compared with Comp. Example 3 containing the natural rubber specifically prescribed by the present invention blended therein but using butadiene-based polymer having a relatively low cis content. Similar improvements are also obvious from Tables 3 and 4 by comparing (Examples 7 and 8)/(Examples 9 and 10) with Comp. Example 4/Comp. Example 5, the rubber compositions of Comp. Examples 4 and 5 each containing the natural rubber specifically prescribed by the present invention blended therein but using butadiene-based polymer having a relatively low cis content.

Further, from Table 2, it is understood that the rubber compositions of Examples 3 and 4 including the modified butadiene-based polymer exhibit better crack growth resistance and low heat generation properties, as compared with the rubber composition of Example 2, although the cis contents of the butadiene-based polymers are substantially the same in Examples 2 to 4. Similarly, it is understood that Example 6 in which the butadiene-based polymer has been modified exhibit better results, as compared with Examples 5 and 6.
Differences as described above are also obvious by comparing Examples 8/Example 10 with Examples 7/Example 9 in Table 3/Table 4, respectively.
Yet further, it is understand from the results shown in Tables 2 to 4 that the effect of improving crack growth resistance and low heat generation properties is sufficiently demonstrated when carbon black having N2SA in the range of 20 to 180 $m^2/g$ is blended in the rubber composition.
From Table 6, it is understood that Example 11 using the natural rubber having the total nitrogen content therein in the range of 0.1 to 0.4 mass % (exclusive of 0.1 mass % and inclusive of 0.4 mass %) exhibits better results than Comp. Example 8.

From Table 7, it is understood that Example 12 using the natural rubber having the total nitrogen content therein in the range of 0.1 to 0.4 mass % (exclusive of 0.1 mass % and inclusive of 0.4 mass %) exhibits better results than Comp. Example 11.

From the facts described above, it is understood that the superior effect of the present invention can be sufficiently demonstrated when the rubber composition contains, by 20 to 80 mass % with respect to 100 mass % of the rubber components, the natural rubber having the total nitrogen content therein in the range of 0.1 to 0.4 mass % (exclusive of 0.1 mass % and inclusive of 0.4 mass %).

The invention claimed is:

1. A rubber composition comprising in 100 mass % of rubber components thereof:
   20-80 mass % of natural rubber in which the total nitrogen content in natural rubber latex is in the range of 0.1 mass % to 0.4 mass % (exclusive of 0.1 mass % and inclusive of 0.4 mass %); and
   butadiene-based polymer having cis content of 90% or higher.

2. The rubber composition of claim 1, wherein the molecular weight distribution (Mw/Mn) of the butadiene-based polymer is not larger than 3.5 and the vinyl content thereof is not larger than 2.0%.

3. The rubber composition of claim 1, wherein 100 mass % of the rubber components contains 80-20 mass % of the butadiene-based polymer.

4. The rubber composition of claim 1, wherein the natural rubber is rubber obtained from latex resulting from partial deproteinization of protein in natural rubber latex by mechanical separation techniques, a chemical treatment or a processing method using enzymes.

5. The rubber composition of claim 1, wherein the butadiene-based polymer is modified by a modifying agent, wherein the modifying agent is a heterocyclic nitrile compound represented by the following formula (W1) or formula (W2):

$$\theta\text{-}C\equiv N \quad (W1);$$

$$\theta\text{-}R_x\text{-}C\equiv N \quad (W2),$$

wherein θ resents a heterocyclic group and $R_x$ represents a divalent hydrocarbon group.

6. The rubber composition of claim 5, wherein, in formulae (W1) and (W2), θ is at least one type of heterocyclic group selected from the group consisting of heterocyclic group having nitrogen atom, heterocyclic group having oxygen atom, heterocyclic group having sulfur atom, heterocyclic group having two or more hetero atoms, and heterocyclic group having at least one cyano group.

7. The rubber composition of claim 5, wherein, in formulae (W1) and (W2), θ is one of heteroaromatic ring group, hetero-non-aromatic ring group, and hetero (mono, bi, tri, or poly) cyclic group.

8. The rubber composition of claim 1, wherein the butadiene-based polymer is modified by a modifying agent, and wherein the modifying agent is at least one type of compound selected from compounds having components (a) to (g):
   component (a) as one of a halogenated organic metal compound, halogenated metal compound and an organic metal compound, represented by $R^6{}_nM'Z_{4-n}$, $M'Z_4$, $M'Z_3$, $R^7{}_nM'(\text{—}R^8\text{—}COOR^9)_{4-n}$, or $R^7{}_nM'(\text{—}R^8\text{—}COOR^9)_{4-n}$, (in the formula, $R^6$ to $R^8$ are $C_{1-20}$ hydrocarbon groups, respectively, which may be the same or different from each other, $R^9$ is a $C_{1-20}$ hydrocarbon group of which side chain main contain carbonyl group or ester group, M' is one of tin atom, silicon atom, germanium atom and phosphor atom, Z is a halogen atom, and n is an integer in the range of 0 to 3);
   component (b) as a heterocumulene compound containing in the molecule thereof Y═C═Y' bond (in the formula, Y represents one of carbon atom, oxygen atom, nitrogen atom and sulfur atom, Y' represents one of oxygen atom, nitrogen atom and sulfur atom;
   component (c) as a hetero-3-membered ring compound containing in the molecule thereof a bond represented by formula (I) below,

(In formula (I), Y' represents one of oxygen atom, nitrogen atom and sulfur atom);
   compound (d) as a halogenated isocyano compound;
   compound (e) as $R^{10}\text{—}(COOH)_m$, $R^{11}(COZ)_m$, $R^{12}\text{—}(COO\text{—}R^{13})$, $R^{14}\text{—}OCOO\text{—}R^{15}$, $R^{16}\text{—}(COOCO\text{—}R^{17})_m$, or one of carboxylic acid, acid halide, ester compound, carbonate ester compound and acid anhydride, represented by formula (II),

(In formula (II), $R^{10}$ to $R^{18}$ are $C_{1-50}$ hydrocarbon groups, respectively, which may be the same or different from each other, Z is a halogen atom, and m is an integer in the range of 1 to 5);
   compound (f) as $R^{19}{}_kM''(OCOR^{20})_{4-k}$, $R^{21}{}_kM''(OCO\text{—}R^{22}\text{—}COOR^{23})_{4-k}$, or a metal salt of carboxylic acid, represented by formula (III),

(In formula (III), $R^{19}$ to $R^{25}$ are $C_{1-20}$ hydrocarbon groups, respectively, which may be the same or different from each other, M' is one of tin atom, silicon atom and germanium atom, k is an integer in the range of 0 to 3, and p is 0 or 1); and
   component (g) as one of N-substituted aminoketone, N-substituted aminothioketone, N-substituted aminoaldehyde, N-substituted aminothioaldehyde, and a compound having in the molecule thereof —C-(=M)-N<bond (M represents oxygen atom or sulfur atom).

9. The rubber composition of claim 1, wherein the butadiene-based polymer is modified by a modifying agent, and wherein the modifying agent is at least one type of (h) component selected from the compounds represented by formula (IV),

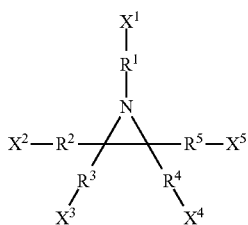

(IV)

(In formula (IV), $X^1$ to $X^5$ each represents hydrogen atom or a functional group having at least one type selected from the group consisting of halogen atom, carbonyl group, thiocarbonyl group, isocyanate group, thioisocyanate group, epoxy group, thioepoxy group, halogenated silyl group, hydrocarvyloxysilyl group, and sulphonyloxy group; $X^1$ to $X^5$ may be the same or different from each other, but at least one of them is not hydrogen atom; $R^1$ to $R^5$ each independently represent a single bond or a divalent $C_{1-18}$ hydrocarbon group; and plural aziridine rings may be bonded by way of any of $X^1$ to $X^5$ and $R^1$ to $R^5$).

10. The rubber composition of claim 9, wherein, in formula (IV), $X^1$ is not hydrogen atom and $R^1$ is not single bond.

11. The rubber composition of claim 1, wherein the butadiene-based polymer is produced by polymerizing butadiene-based monomers by a catalytic system constituted of at least one component selected from:

component (A): a reactant obtained by reacting a substance containing lanthanide rare earth element(s) having atomic number 57-71 in periodic table or a compound thereof with a Lewis base;

component (B): an organic aluminum compound represented by $AlR^{26}R^{27}R^{28}$ (in the formula, $R^{26}$ and $R^{27}$ are $C_{1-10}$ hydrocarbon groups or hydrogen atoms, respectively, which may be the same or different from each other, $R^{28}$ is a $C_{1-10}$ hydrocarbon group, and $R^{28}$ may be either the same as or different from $R^{26}$ and $R^{27}$); and component (C): Lewis acid, a complex compound obtained from a reaction between a metal halide and a Lewis base, and an organic metal compound containing active halogen.

12. The rubber composition of claim 11, wherein the substance containing lanthanide rare earth element(s) in said component (A) is a salt or a complex soluble to a hydrocarbon solvent of neodymium.

13. The rubber composition of claim 11, wherein the substance containing lanthanide rare earth element(s) in said component (A) is one of carboxylic acid salt, alkoxide, β-diketone complex, phosphate salt, phosphite salt, and a reactant between carboxylic acid, phosphoric acid or phosphonic acid and Lewis base, of the rare earth element(s).

14. The rubber composition of claim 1, wherein the cis content of the butadiene-based polymer is 98% or more.

15. The rubber composition of claim 1, wherein the content of non-rubber components in the natural rubber is less than 6 mass %.

* * * * *